United States Patent
Maruyama et al.

(10) Patent No.: US 7,038,862 B2
(45) Date of Patent: *May 2, 2006

(54) OBJECTIVE LENS FOR OPTICAL PICK-UP

(75) Inventors: Koichi Maruyama, Tokyo (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/867,781

(22) Filed: Jun. 16, 2004

(65) Prior Publication Data

US 2005/0002118 A1    Jan. 6, 2005

(30) Foreign Application Priority Data

Jun. 17, 2003 (JP) ............................. 2003-171467

(51) Int. Cl.
*G02B 3/02* (2006.01)
(52) U.S. Cl. ................................ 359/719; 369/112.03
(58) Field of Classification Search ........ 359/642–793; 369/112.01, 112.03–112.1, 112.15, 112.23–112.29
See application file for complete search history.

(56) References Cited

U.S. PATENT DOCUMENTS

| 6,118,594 A | 9/2000 | Maruyama ................... 359/719 |
| 6,449,095 B1 | 9/2002 | Ohtaki et al. ................ 359/566 |
| 6,587,272 B1 | 7/2003 | Nakai .......................... 359/569 |
| 2001/0008513 A1 | 7/2001 | Arai et al. .............. 369/112.08 |
| 2003/0185134 A1* | 10/2003 | Kimura et al. .......... 369/112.08 |
| 2003/0202451 A1* | 10/2003 | Kimura et al. .......... 369/112.08 |
| 2004/0156301 A1* | 8/2004 | Ikenaka ................... 369/112.17 |
| 2004/0246873 A1* | 12/2004 | Maruyama et al. ..... 369/112.03 |
| 2005/0078593 A1* | 4/2005 | Maruyama et al. ..... 369/112.23 |

FOREIGN PATENT DOCUMENTS

| JP | 2000-75118 | 3/2000 |
| JP | 2000-81566 | 3/2000 |
| JP | 2001-93179 | 4/2001 |
| JP | 2001-195769 | 7/2001 |

* cited by examiner

*Primary Examiner*—Scott J. Sugarman
*Assistant Examiner*—Darryl J. Collins
(74) *Attorney, Agent, or Firm*—Greenblum & Bernstein, P.L.C.

(57) ABSTRACT

An objective lens that satisfies conditions:

$$-0.02 < f1 \times M1 < 0.02 \quad (1)$$

$$-0.02 < f2 \times M2 < 0.02 \quad (2)$$

$$-0.29 < f3 \times M3 < -0.19. \quad (3)$$

At least one of lens surfaces of the objective lens includes a diffracting structure having a first region for converging the third light beam on a data recording layer of the third optical disc. The diffracting structure within the first region is configured such that a diffraction order at which diffraction efficiency of the first light beam is maximized is a sixth order, a diffraction order at which the diffraction efficiency of the second light beam is maximized is a fourth order, and a diffraction order at which the diffraction efficiency of the third light beam is maximized is a third order.

21 Claims, 8 Drawing Sheets

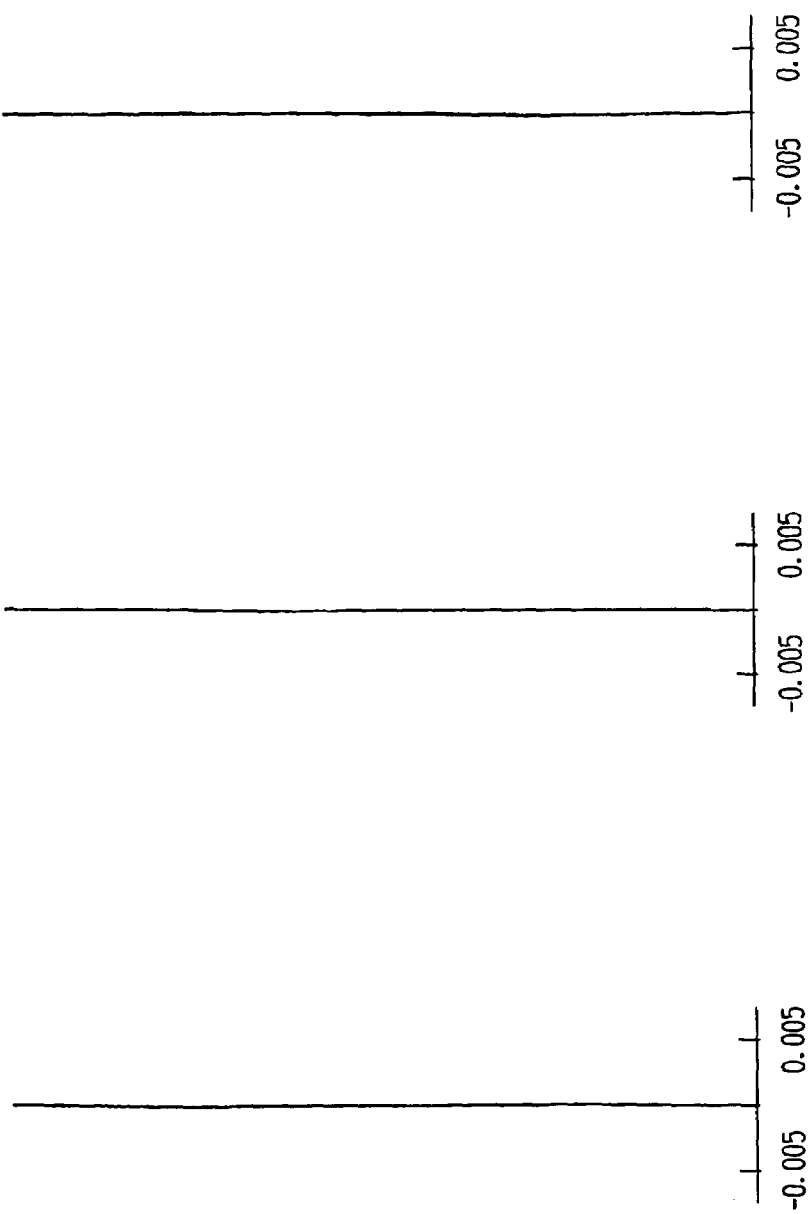

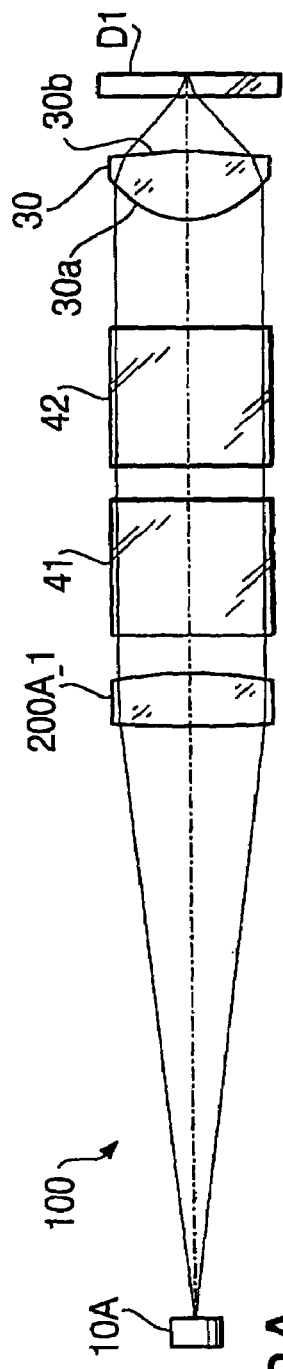
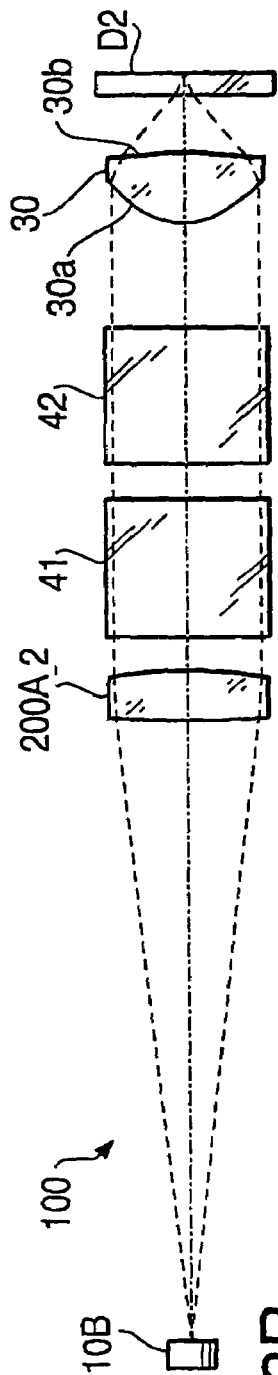
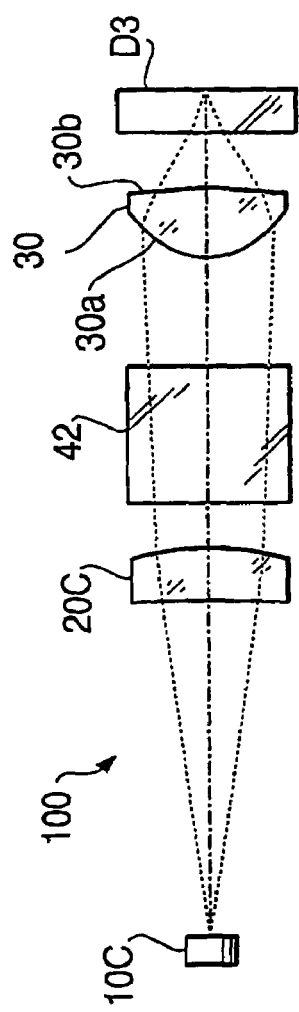
FIG.8A
FIG.8B
FIG.8C

OBJECTIVE LENS FOR OPTICAL PICK-UP

BACKGROUND OF THE INVENTION

The present invention relates to an objective lens for an optical pick-up used for an optical disc drive, which is capable of recording data to and/or reproducing data from a plurality of types of optical discs having different recording densities and having different thicknesses of cover layers.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When the recording/reproducing for the DVD having a higher recording density is performed, a smaller beam spot diameter is required on the data recording layer of the DVD relative to a beam spot used for the CD having a lower recording density. For this reason, the optical pick-up is configured such that a NA (numerical aperture) is changed to a higher value to obtain a smaller beam spot diameter when the DVD is used and that the NA is changed to a lower value to obtain a larger beam spot diameter when the CD or CD-R is used.

The diameter of the beam spot decreases as a wavelength of the laser beam decreases. Therefore, in general, a laser beam having a wavelength of about 660 nm, which is lower than a wavelength of about 780 nm for the CD, is used for the DVD.

A condition of a spherical aberration in an optical system of the optical pick-up changes depending on a thickness of the cover layer of the optical disc being used. Therefore, it is required to correct the spherical aberration caused when the optical disc is changed to another one having different thickness of cover layer.

Japanese Patent Provisional Publication No. 2000-81566 discloses a CD/DVD compatible objective lens (i.e., an objective lens of an optical pick-up that can be used for both of the DVD and CD). The CD/DVD compatible objective lens has a diffracting structure on one of its lens surfaces. The diffracting structure has a plurality of concentric ring-shaped steps having a function of properly converging an incident beam on a data recording layer of an optical disc regardless of the thickness of the cover layer of the optical disc being used.

That is, the diffracting structure has wavelength dependence such that the spherical aberration changes when the wavelength of the incident beam changes. Consequently, the CD/DVD compatible objective lens is capable of supporting various types of optical discs having different thicknesses of the cover layers.

More specifically, the lens surface on which the diffracting structure is formed has an inner area which provides an NA required for the optical disc having relatively low recording density (e.g., CD), and an outer area which is situated outside the inner area and which provides an NA required for the optical disc having relatively high recording density (e.g., DVD).

The diffracting structure within the inner area has a function that the laser beam for the CD is properly converged on the data recording layer of the CD and that the laser beam for the DVD is properly converged on the data recording layer of the DVD. The diffracting structure within the outer area has a function that the laser beam for the CD does not contribute to the formation of the beam spot for the CD and the laser beam for the DVD is most properly converged on the data recording layer of the DVD.

With the above mentioned structure, with regard to the laser beam for CD, only the laser beam passed through the inner area is properly converged on the data recording layer of the CD, while the laser beam passed through the outer area diffuses on the data recording layer of the CD. Consequently, the beam spot having relatively large diameter is formed on the data recording layer of the CD.

With regard to the beam for DVD, both of the inner and outer areas converge the laser beam passing therethrough on the data recording layer of the DVD. Consequently, the beam spot having relatively small diameter is formed on the data recording layer of the DVD.

Recently, new technical standards concerning optical discs having further higher recording densities are proposed. One of such optical discs is an HD DVD (High Definition DVD) having a recording density higher than that of the DVD. The HD DVD has a thickness of the cover layer smaller than or equal to that of the DVD. For the HD DVD, the laser beam having a wavelength smaller than that of the DVD (a so-called blue laser having a wavelength of, for example, about 405 nm) is required.

Against the background of the start of the practical use of the optical discs having further higher recording densities such as an HD DVD, the demand for optical disc devices which can provide compatibility among existing optical discs (e.g., CD and DVD) and the optical discs of the new technical standards (e.g., HD DVD) is increasing. To accomplish such an optical disc device, an objective lens that is capable of converging incident beam on the data recording layers of various types of optical discs including the CD, DVD and HD DVD is required.

However, the objective lens disclosed in the publication No. 2000-81566 is not configured to support the HD DVD. That is, when the blue laser beam is incident on the objective lens disclosed in the publication, aberrations including a spherical aberration are caused and therefore a beam spot suitable for the recordation and the reproduction of data of the HD DVD can not be formed.

Japanese Patent Provisional Publication No. 2001-195769 discloses an objective lens and an optical pick-up configured to support the HD DVD, DVD and CD. The optical pick-up disclosed in the publication 2001-195769 is configured such that a collimated light beam is incident on the objective lens when the HD DVD and the DVD is used, and a diverging beam is incident on the objective lens when the CD is used. However, in this publication no explanation is made on what type of a diffracting structure is desirable to form a beam spot suitable for recording data to and/or reproducing data from each of the HD DVD, DVD and CD.

In many cases, a diffracting structure is configured to have a sawtooth shape (i.e., a blazed shape) in order to increase the amount of light for a particular order of diffracted light. Japanese Patent Provisional Publication No. 2000-75118 discloses an objective lens having a diffracting structure. The diffracting structure disclosed in the publication 2000-75118 is configured to effectively obtain a certain order of diffracted light within a wide range of wavelength. The diffracting structure has a laminated structure of two diffraction gratings.

However, if the two diffraction gratings are laminated with respect to each other, there may be a case where the two diffraction gratings are laterally shifted with respect to each other and thereby the amount of light decreases. For this reason, the diffracting structure disclosed in 2000-75118 requires a manufacturing process with a high degree of precision. Since the high degree of manufacturing precision is required, it is not desirable to use the objective lens disclosed in 2000-75118 for an objective lens, used for an optical pick-up, which has a very low cost and which is generally mass-produced.

SUMMARY OF THE INVENTION

The present invention is advantageous in that it provides an objective lens of an optical pick-up which is capable of converging an incident beam on data recording layers of various types of optical discs including existing optical discs and an HD DVD.

According to an aspect of the invention, there is provided an objective lens for an optical pick-up which is used to record data to and/or to reproduce data from at least three types of optical discs by selectively using one of at least three light beams having different wavelengths, the at least three types of optical discs having at least two different thicknesses of cover layers. When a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 mm, t2 is substantially equal to 0.6 mm, and t3 is substantially equal to 1.2 mm.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship $NA1 \geq NA2 > NA3$ is satisfied. When the first and second optical discs are used, substantially collimated light beams of the first and second light beams being incident on the objective lens, respectively. When the third optical disc is used, a diverging beam of the third light beam is incident on the objective lens.

Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) are satisfied:

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3).$$

Further, at least one of lens surfaces of the objective lens includes a diffracting structure having a first region for converging the third light beam on a data recording layer of the third optical disc. The diffracting structure within the first region is configured such that a diffraction order at which diffraction efficiency of the first light beam is maximized is a sixth order, a diffraction order at which the diffraction efficiency of the second light beam is maximized is a fourth order, and a diffraction order at which the diffraction efficiency of the third light beam is maximized is a third order.

With regard to a conventional CD/DVD compatible objective lens that supports recording operation and/or reproducing operation only for the CD and DVD, the spherical aberration can be corrected for two different wavelengths by forming a diffraction structure on a lens surface of the CD/DVD compatible objective lens. However, if three different wavelengths are required, the spherical aberration can not be corrected for all of the three different wavelengths due to a shortage of degrees of freedom concerning a lens design. To solve such a problem, the objective lens according to the above mentioned aspect of the invention is configured such that the spherical aberration is corrected by the diffracting structure for two of the three different wavelengths and that, with regard to the remaining one wavelength, the spherical aberration is corrected by changing the degree of divergence of the beam being incident on the objective lens.

When the wavelengths of the first and third light beams are about 405 nm and about 780 nm, respectively, a relative spherical aberration between the first wavelength and the third wavelength can not be corrected by the diffracting structure. The reason is that since power of a diffraction lens (i.e., the diffracting structure) is represented by $m \times \lambda / d$ (where m represents a diffraction order, $\lambda$ represents a wavelength, and d represents a pitch of a diffraction grating), the power of the diffracting structure for the sixth order diffracted light of the first light beam becomes equal to the power of the diffracting structure for the third order diffracted light of the third light beam. For this reason, as described above, with regard to the third light beam, the diverging beam is used to correct the spherical aberration.

When a finite optical system is used in the optical pick-up, an aberration condition may be deteriorated due to an occurrence of a coma of an off-axis ray by a tracking operation. In addition, a tolerance to the aberration condition becomes lower as the required numerical aperture increases.

For this reason, the objective lens according to the above mentioned aspect of the invention is used in a situation where the substantially collimated light beam is incident on the objective lens when one of the first and second optical discs, each of which requires a relatively high numerical aperture, is used, and the diverging beam is incident on the objective lens when the third optical disc, which requires a relatively low numerical aperture, is used. With this structure, even if the objective lens is shifted from an optical axis thereof by the tracking operation, the amount of the coma and astigmatism caused when the first or second optical disc is used can be lowered to a negligible level.

An refractive index of a coupling lens, which may be used together with the objective lens in the optical pick-up, changes depending on a wavelength of the light beam being used. Therefore, when the optical pick-up is configured such that a common coupling lens is used for the first and second light beams and light sources emitting the first and second light beams are arranged on a common substrates (i.e. when the two light sources are located at the same distance from the objective lens), at least one of the first and second beams being incident on the objective lens becomes a diverging beam or a converging beam. For this reason, the objective lens according to the above mentioned aspect of the invention is configured to satisfy the conditions (1) and (2). By satisfying the conditions (1) and (2), the amount of the aberration caused by the tracking operation can be sufficiently reduced.

Further, the objective lens according to the above mentioned aspect of the invention is configured to satisfy the condition (3). By satisfying the condition (3), the spherical aberration is sufficiently corrected for the third optical disc. If the f3×M3 gets larger than the upper limit of the condition (3), an overcorrected spherical aberration remains. If the f3×M3 gets lower than the lower limit of the condition (3), an undercorrected spherical aberration occurs.

With the above mentioned configuration, the spherical aberration is sufficiently corrected for all of the first, second and third optical discs, and the suitable beam spot can be formed on each of the data recording layers of the first, second and third optical discs.

Further, according to the above mentioned configuration, the objective lens can be shaped by using a single mold, which reduces manufacturing cost in comparison with a case where a conventional objective lens configured to have the two diffraction gratings laminated with respect to each other is produced.

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths respectively corresponding to the at least three types of optical discs, one of the at least three light beams being selectively emitted when one of the at least three types of optical discs is used, and an objective lens.

When a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 mm, t2 is substantially equal to 0.6 mm, and t3 is substantially equal to 1.2 mm.

When a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied.

When the first and second optical discs are used, substantially collimated light beams of the first and second light beams are incident on the objective lens, respectively. When the third optical disc is used, a diverging beam of the third light beam being incident on the objective lens.

Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) are satisfied:

$$0.02 < f1 \times M1 < 0.02 \quad (1)$$

$$0.02 < f2 \times M2 < 0.02 \quad (2)$$

$$0.29 < f3 \times M3 < -0.19 \quad (3).$$

At least one of lens surfaces of the objective lens includes a diffracting structure having a first region for converging the third light beam on a data recording layer of the third optical disc. The diffracting structure within the first region is configured such that a diffraction order at which diffraction efficiency of the first light beam is maximized is a sixth order, a diffraction order at which the diffraction efficiency of the second light beam is maximized is a fourth order, and a diffraction order at which the diffraction efficiency of the third light beam is maximized is a third order.

With the above mentioned configuration, the spherical aberration is sufficiently corrected for all of the first, second and third optical discs, and the suitable beam spot can be formed on each of the data recording layers of the first, second and third optical discs.

With regard to the above mentioned two aspect of the invention, the diffracting structure within the first region may include a plurality of refractive surfaces having steps between adjacent refractive surfaces. The steps may have a repetition of a first step giving an additional optical path length being substantially equal to $8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step.

When the diffracting structure is configured such that, at each step, an additional optical path length is $6\lambda_1$, relatively high diffraction efficiency can be obtained for a design wavelength. However, when the diffracting structure has such a configuration, if the wavelength of the first light beam decreases or the wavelength of the second light beam increase, the amount of a phase deviation in a peripheral portion of a zone of a diffraction grating becomes larger, and thereby the diffraction efficiency decreases.

Such deterioration of the diffraction efficiency can be prevented by employing another configuration of the diffracting structure in which the third order diffracted light and the second order diffracted light are used for the first light beam and the second light beam, respectively, and the width of each annular zone is reduced to a half size. However, when the wavelength of the third light beam is two times as large as that of the first light beam, the third light beam is divided into the first order diffracted light and the second order diffracted light. Consequently, usage efficiency of light is reduced to about 40%.

By contrast, according to the above mentioned configuration of the diffracting structure having the repletion of the steps corresponding to the additional optical path lengths of $8\lambda_1$ and $-2\lambda_1$, high diffraction efficiency is attained. This configuration corresponds to a diffracting structure in which a step height corresponding to an additional optical path length of about $5\lambda_1$ is added at every second step with respect to a base diffraction g structure which used the third order diffracted light for the first light beam. In this case, a total phase shift amount for the second light beam becomes about $3\lambda_2$, and thereby the high diffraction efficiency is attained. Also, the total phase shift amount for the third light beam becomes about $4.0\lambda_3$ because the phase shift amount for the third light beam is $1.5\lambda_3$ in the base diffracting structure and the added phase shift amount for the third light beam is $2.5\lambda_3$.

Alternatively, the diffracting structure within the first region may includes a plurality of refractive surfaces having steps between adjacent refractive surfaces. The steps may have a repetition of a first step giving an additional optical path length being substantially equal to $-8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

Optionally, the diffracting structure may have a second region for converging the first and second light beams on data recording layers of the first and second optical discs, respectively. The diffracting structure within the second region does not contribute to converging the third light beam. The diffracting structure within the second region is configured such that a diffraction order at which diffraction efficiency of the first light beam is maximized is a third order, and a diffraction order at which the diffraction efficiency of the second light beam is maximized is a second order.

With this configuration, the third light beam passed through the second region is diffused. The deterioration of a wavefront due to change of wavelengths of the light beams caused by temperature variations can also be prevented.

Still optionally, a following condition (4) may be satisfied:

$$f1 \times NA1 > f2 \times NA2 \tag{4}$$

In this case, the diffracting structure may have a third region which is located outside the second region and which converges only the first light beam. The third region is configured such that the diffraction order at which the diffraction efficiency of the first light beam is maximized in the third region is different from the diffraction order at which the diffraction efficiency of the first light beam is maximized in the second region.

With this configuration, each of the second and third light beams passed through the third region is diffused.

Alternatively, a following condition (5) may be satisfied:

$$f1 \times NA1 < f2 \times NA2 \tag{5}$$

In this case, the diffracting structure may have a third region which is located outside the second region and which converges only the second light beam. The third region is configured such that the diffraction order at which the diffraction efficiency of the second light beam is maximized in the third region is different from the diffraction order at which the diffraction efficiency of the second light beam is maximized in the second region.

With this configuration, each of the first and third light beams passed through the third region is diffused.

In a particular case, the first region may be located to include an optical axis of the objective lens.

In a particular case, the first region may be located to include an optical axis of the objective lens, and the second region may be located outside the first region.

With regard to the optical pick-up, when wavelengths of the first, second and third light beams are respectively represented by $\lambda_1$, $\lambda_2$ and $\lambda_3$, and refractive indexes of the objective lens for the first, second and third light beams are respectively represented by $n_1$, $n_2$ and $n_3$, following relationships may be satisfied:

$$\lambda_1/(n_1-1):\lambda_3/(n_3-1) \cong 1:2 \tag{6}$$

$$\lambda_1/(n_1-1):\lambda_2/(n_2-1) \cong 3:5 \tag{7}$$

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths respectively corresponding to the at least three types of optical discs, one of the at least three light beams being selectively emitted when one of the at least three types of optical discs is used, a diffraction element through which each of the at least three light beams passes, and an objective lens located between the diffraction element and one of the at least three types of optical discs being used.

Further, at least one of surfaces of the diffraction element includes a diffracting structure which includes a plurality of refractive surfaces having steps between adjacent refractive surfaces. The steps has a repetition of a first step giving an additional optical path length being substantially equal to $8\lambda_1$ ($\lambda_1$ is a wavelength of one of the at least three light beams having a shortest wavelength), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step.

With this configuration, diffraction efficiency can be kept at a high level for each of the first, second and third light beams.

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths respectively corresponding to the at least three types of optical discs, one of the at least three light beams being selectively emitted when one of the at least three types of optical discs is used, a diffraction element through which each of the at least three light beams passes, and an objective lens located between the diffraction element and one of the at least three types of optical discs being used.

Given that one of the at least three types of optical discs to be used for recording data and/or reproducing data using a first light beam of the at least three light beams having a wavelength shortest of all wavelengths of the at least three light beams is a first optical disc, one of the at least three types of optical discs to be used for recording data and/or reproducing data using a second light beam of the at least three light beams having a wavelength longer than that of the first light beam is a second optical disc, and one of the at least three types of optical discs to be used for recording data and/or reproducing data using a third light beam of the at least three light beams having a wavelength longest of all of the wavelengths of the at least three light beams is a third optical disc, following conditions (1), (2) and (3) are satisfied:

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3)$$

where f1, f2 and f3 represent focal lengths of the objective lens when the first, second and third optical discs are used, respectively, and M1, M2 and M3 represent magnification of the objective lens when the first, second and third optical discs are used, respectively.

Further, at least one of surfaces of the diffraction element includes a diffracting structure which includes a plurality of refractive surfaces having steps between adjacent refractive surfaces. The steps has a repetition of a first step giving an additional optical path length being substantially equal to $8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step.

In this structure, when wavelengths of the second and third light beams are respectively represented by %2 and 3, and refractive indexes of the objective lens for the first, second and third light beams are respectively represented by $n_1$, $n_2$ and $n_3$, following relationships are satisfied:

$$\lambda_1/(n_1-1):\lambda_3/(n_3-1) \cong 1:2 \quad (6)$$

$$\lambda_1/(n_1-1):\lambda_2/(n_2-1) \cong 3:5 \quad (7).$$

With the above mentioned configuration, the spherical aberration is sufficiently corrected for all of the first, second and third optical discs, and the suitable beam spot can be formed on each of the data recording layers of the first, second and third optical discs. Diffraction efficiency can be kept at a high level for each of the first, second and third light beams.

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths respectively corresponding to the at least three types of optical discs, one of the at least three light beams being selectively emitted when one of the at least three types of optical discs is used, a diffraction element through which each of the at least three light beams passes, and an objective lens located between the diffraction element and one of the at least three types of optical discs being used.

At least one of surfaces of the diffraction element includes a diffracting structure which includes a plurality of refractive surfaces having steps between adjacent refractive surfaces. The steps has a repetition of a first step giving an additional optical path length being substantially equal to $-8\lambda_1$ ($\lambda_1$ is a wavelength of one of the at least three light beams having a shortest wavelength), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

With this configuration, diffraction efficiency can be kept at a high level for each of the first, second and third light beams.

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths respectively corresponding to the at least three types of optical discs, one of the at least three light beams being selectively emitted when one of the at least three types of optical discs is used, a diffraction element through which each of the at least three light beams passes, and an objective lens located between the diffraction element and one of the at least three types of optical discs being used.

Given that one of the at least three types of optical discs to be used for recording data and/or reproducing data using a first light beam of the at least three light beams having a wavelength shortest of all wavelengths of the at least three light beams is a first optical disc, one of the at least three types of optical discs to be used for recording data and/or reproducing data using a second light beam of the at least three light beams having a wavelength longer than that of the first light beam is a second optical disc, and one of the at least three types of optical discs to be used for recording data and/or reproducing data using a third light beam of the at least three light beams having a wavelength longest of all of the wavelengths of the at least three light beams is a third optical disc, following conditions (1), (2) and (3) are satisfied;

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3)$$

where f1, f2 and f3 represent focal lengths of the objective lens when the first, second and third optical discs are used, respectively, and M1, M2 and M3 represent magnification of the objective lens when the first, second and third optical discs are used, respectively.

Further, at least one of surfaces of the diffraction element includes a diffracting structure which includes a plurality of refractive surfaces having steps between adjacent refractive surfaces. The steps has a repetition of a first step giving an additional optical path length being substantially equal to $-8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

Further, when wavelengths of the second and third light beams are respectively represented by $\lambda_2$ and $\lambda_3$, and refractive indexes of the objective lens for the first, second and third light beams are respectively represented by $n_1$, $n_2$ and $n_3$, following relationships are satisfied:

$$\lambda_1/(n_1-1):\lambda_3/(n_3-1) \cong 1:2 \quad (6)$$

$$\lambda_1/(n_1-1):\lambda_2/(n_2-1) \cong 3:5 \quad (7).$$

With the above mentioned configuration, the spherical aberration is sufficiently corrected for all of the first, second and third optical discs, and the suitable beam spot can be formed on each of the data recording layers of the first, second and third optical discs. Diffraction efficiency can be kept at a high level for each of the first, second and third light beams.

BRIEF DESCRIPTION OF THE ACCOMPANYING DRAWINGS

FIG. 5 is a graph illustrating a spherical aberration caused in the optical pick-up of first and second examples when the first laser beam passes through the objective lens;

FIG. 6 is a graph illustrating a spherical aberration caused in the optical pick-up of the first and second examples when the second laser beam passes through the objective lens;

FIG. 7 is a graph illustrating a spherical aberration caused in the optical pick-up of the first and second examples when the third laser beam passes through the objective lens;

FIG. 8A shows a configuration of the optical pick-up of a third example when data is recorded to and/or reproduced from an optical disc D1;

FIG. 8B shows the configuration of the optical pick-up of the third example when data is recorded to and/or reproduced from an optical disc D2;

FIG. 8C shows the configuration of the optical pick-up of the third example when data is recorded to and/or reproduced from an optical disc D3;

DETAILED DESCRIPTION OF THE EMBODIMENTS

Hereinafter, an embodiment according to the invention is described with reference to the accompanying drawings.

Figure 1:
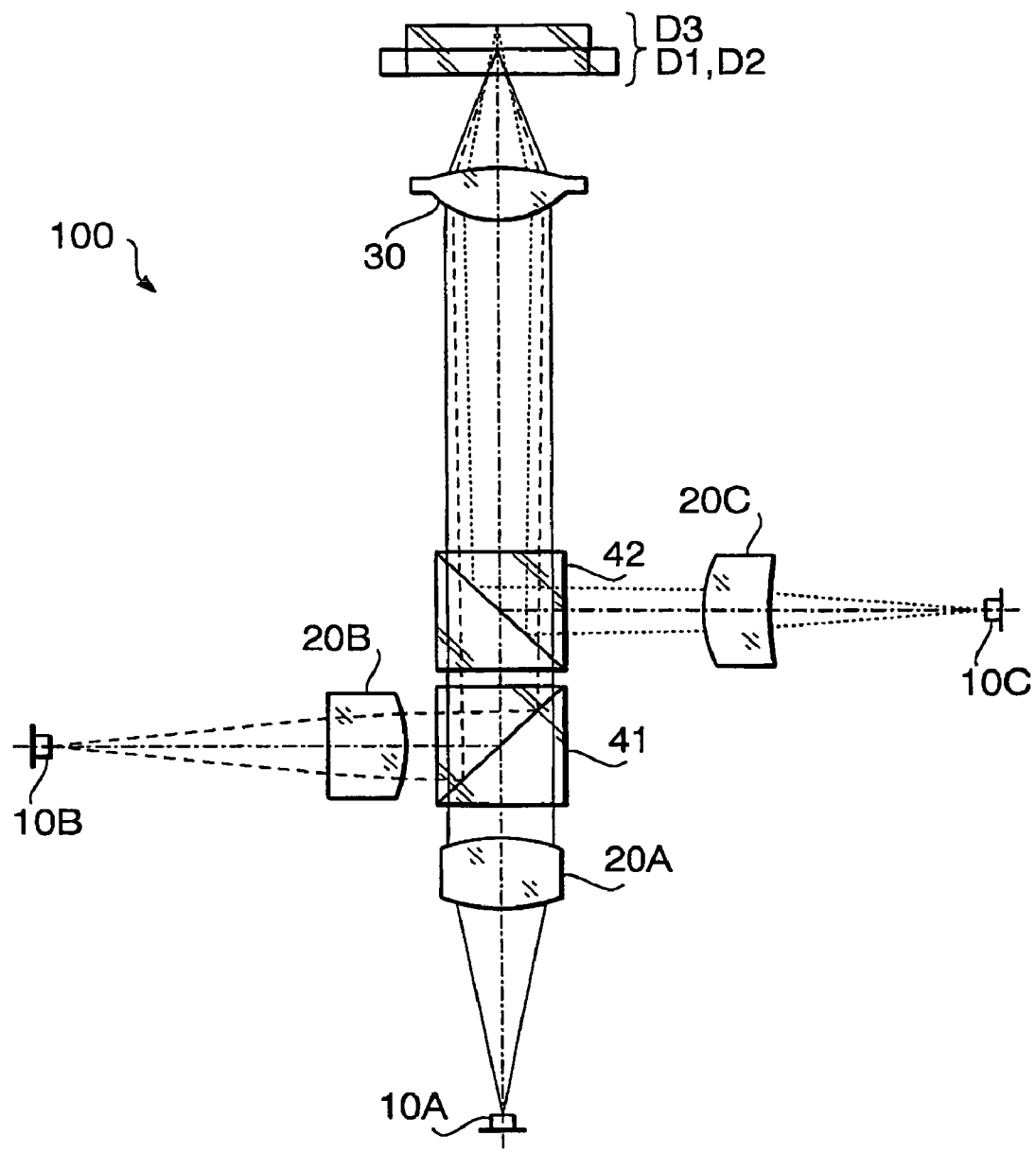
FIG. 1 shows a configuration of an optical pick-up according to an embodiment of the invention.

FIG. 1 shows a configuration of an optical pick-up 100 according to the embodiment of the invention. The optical pick-up 100 is mounted on an optical disc device which is capable of recording data to and/or reproducing data from optical discs D1, D2 and D3 which have different recording densities and different thicknesses of cover layers. In actuality, when the recordation or the reproduction operation is performed, one of optical discs D1, D2 and D3 is placed on a turn table (not shown) in the optical disc device.

In FIG. 1 (and each of FIGS. 2A–2C), a reference axis of the optical pick-up 100 is represented by a chain line, and laser beams emitted by light sources 10A, 10B and 10C are represented by a solid line, a dashed line, and a dotted line, respectively.

In this embodiment, the optical disc D1 has the highest recording density of all of the optical discs D1, D2 and D3. The optical disc D2 has the second highest recording density. The recording density of the optical disc D3 is the lowest of all of the optical discs D1, D2 and D3. The optical disc D1 is, for example, an HD DVD, the optical disc D2 is for example, a DVD or DVD-R, and the optical disc D3 is, for example, a CD or CD-R.

As shown in FIG. 1, the optical pick-up 100 includes the light sources 10A, 10B and 10C which are respectively used for the optical discs D1, D2 and D3, coupling lenses 20A, 20B and 20C, beam splitters 41 and 42, and an objective lens 30. Laser beams emitted by the light sources 10A, 10B and 10C pass through the coupling lenses 20A, 20B and 20C, respectively, and then directed to a common optical path by the beam splitters 41 and 42 to be incident on the objective lens 30. In the following explanation, the laser beam for the optical disc D1 is represented by a first laser beam, the laser beam for the optical disc D2 is represented by a second laser beam, and the laser beam for the optical disc D3 is represented by a third laser beam.

Each of the first, second and the third laser beams emerged from the beam splitter 42 is converged by the objective lens 30 on the recording layer of the corresponding optical disc. That is, when the optical disc D1 is used, the first laser beam is converged by the objective lens 30 on the data recording layer of the optical disc D1. When the optical disc D2 is used, the second laser beam is converged by the objective lens 30 on the data recording layer of the optical disc D2. When the optical disc D3 is used, the third laser beam is converged by the objective lens 30 on the data recording layer of the optical disc D3.

Figure 2A:
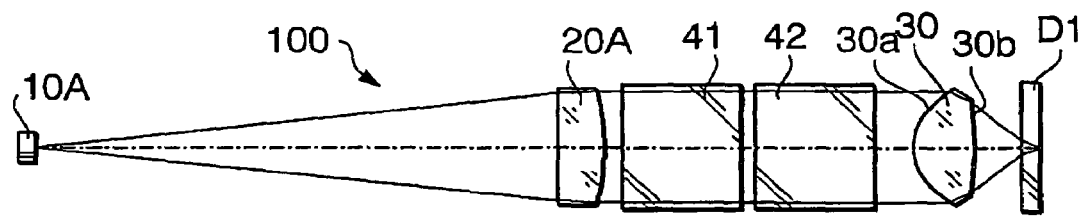
FIG. 2A shows the configuration of the optical pick-up when data is recorded to and/or reproduced from an optical disc D1.
Figure 2B:
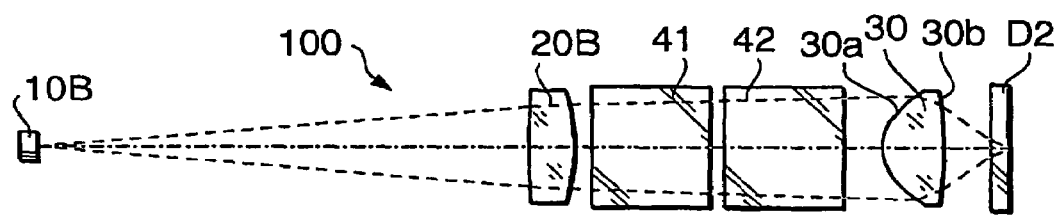
FIG. 2B shows the configuration of the optical pick-up when data is recorded to and/or reproduced from an optical disc D2.
Figure 2C:
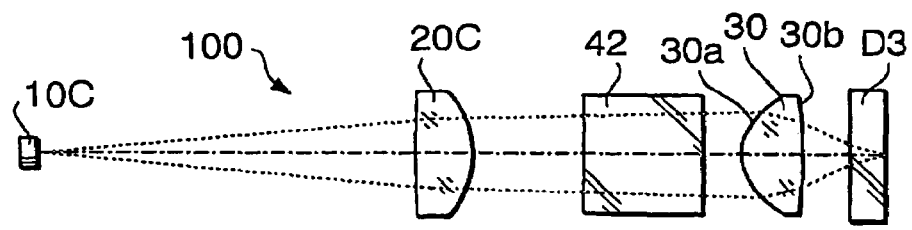
FIG. 2C shows the configuration of the optical pick-up when data is recorded to and/or reproduced from an optical disc D3.

FIGS. 2A, 2B and 2C respectively show the configurations of the optical pick-up 100 when data is recorded to and/or reproduced from the optical discs D1, D2 and D3. Although in each of FIG. 1 and FIGS. 2A–2C, an optical axis of the objective lens 30 coincides with the reference axis of the optical pick-up 100, there is a case where the optical axis of the objective lens 30 shifts from the reference axis by, for example, a tracking operation.

In this embodiment, given that the thicknesses of cover layers of the optical discs D1, D2 and D3 are represented by t1, t2 and t3, respectively, t1≅0.6 mm, t2≅0.6 mm and t3≅1.2 mm.

It is required to change an NA (numerical aperture) in accordance with the type of the optical disc being used so as to attain a required diameter of a beam spot suitable for recording data to and/or reproducing data from one of the optical discs D1, D2 and D3. Since the optical disc D1 has the highest recording density, the required NA for the optical disc D1 is largest of all of the optical discs D1, D2 and D3. In this embodiment, given that the numerical apertures for recording data to and/or reproducing data from the optical discs D1, D2 and D3 are NA1, NA2 and NA3, respectively, the following relationship holds.

$$NA1 \geqq NA2 > NA3$$

The light source 10A is used for recording data to and/or reproducing data from the optical disc D1 having the highest recording density. To form the beam spot having the smallest diameter of all of the beam spots for the optical discs D1, D2 and D3, the light sources 10A is configured to emit the first laser beam having the shortest wavelength of all of wavelengths of the light sources 10A, 10B and 10C. The light source 10C is used for recording data to and/or reproducing data from the optical disc D3 having the lowest recording density. To form the beam spot having the largest diameter of all of the beam spots for the optical discs D1, D2 and D3, the light source 10C is configured to emit the third laser beam having the longest wavelength of all of wavelengths of the light sources 10A, 10B and 10C.

The light source 10B is used for recording data to and/or reproducing data from the optical disc D2 having the relatively high recording density. To form the beam spot having the relatively small diameter, the light source 10B is configured to emit the second laser beam having the second shortest wavelength of all of the wavelengths of the first through third laser beams.

In an example of the configuration shown in FIG. 1, the light sources 10A, 10B and 10C are located at positions different from one another. However, in another example, the light sources 10A, 10B and 10C may be arranged in positional relationships different from that shown in FIG. 1. For example, the light sources 10A, 10B and 10C may be aligned in a line on a common substrate.

The objective lens 30 is a biconvex single element lens made of plastic. The objective lens 30 has a first surface 30a located on a light source side and a second surface 30b. When the thicknesses of the cover layers of the optical discs D1 and D3 (D2 and D3) are different from one another and the wavelengths of the light beams for the optical discs D1, D2 and D3 are different from one another, a spherical aberration changes depending on the type of the optical disc being used.

Therefore, in this embodiment, to correct the spherical aberration for all of the optical discs D1, D2 and D3, the objective lens 30 is configured to have a diffracting structure on one of its lens surfaces. The diffracting structure has a plurality of annular zones concentrically arranged about the optical axis of the objective lens 30. That is, the diffracting structure has a plurality of concentric ring-shaped minute steps.

Figure 3:
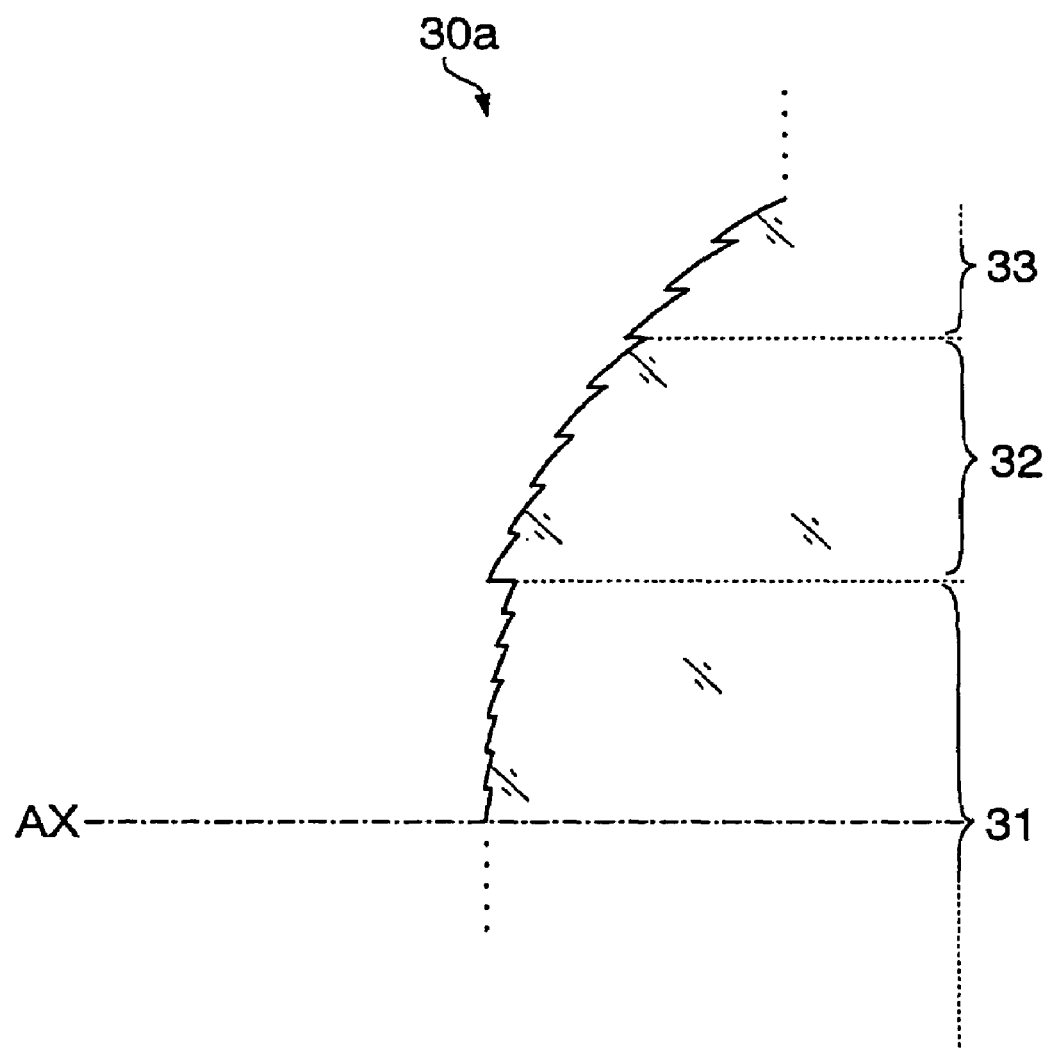
FIG. 3 is a cross-sectional view of an objective lens illustrating a configuration of a diffracting structure when the diffracting structure is formed on a first surface of the objective lens.

FIG. 3 is a cross sectional view of the objective lens 30 illustrating a configuration of the diffracting structure when the diffracting structure is formed on the first surface 30a. As shown in FIG. 3, the first surface 30a is divided into a first region 31 including the optical axis of the objective lens 30, a second region 32 located outside the first region 31, and a third region 33 which is located outside the second region 32 and continues from the outermost portion of the second region 32 to the outermost portion (not shown in FIG. 3) of the first surface 30a.

As described in detail later, the diffracting structure formed within each of the first, second and third regions 31, 32 and 33 is configured such that each optical path difference given by adjacent annular zones becomes about an integral multiple of a certain wavelength.

The diffracting structure formed within the first region 31 is configured such that the first, second and third laser beams are properly converged on the data recording layers of the optical discs D1, D2 and D3, respectively. The diffracting structure formed within the first region 31 has the function of canceling a change of the spherical aberration caused, in a refractive lens portion of the objective lens 30, by a wavelength difference between the wavelength of the first laser beam and the wavelength of the second laser beam.

One example of a configuration with regard to the diffracting structure within the first region 31 is as follows. The diffracting structure within the first region 31 is configured such that a diffraction order at which diffraction efficiency for the first laser beam is maximized is a sixth order, a diffraction order at which the diffraction efficiency for the second laser beam is maximized is a fourth order, and a diffraction order at which the diffraction efficiency for the third laser beam is maximized is a third order.

With this structure, each of the first, second and third laser beams is converged by the diffracting structure with high diffraction efficiency. In particular, since an optical path difference given to the first laser beam by the first region 31 is approximately three times as large as a wavelength of the third laser beam, usage efficiency of light is very high.

Figure 4:
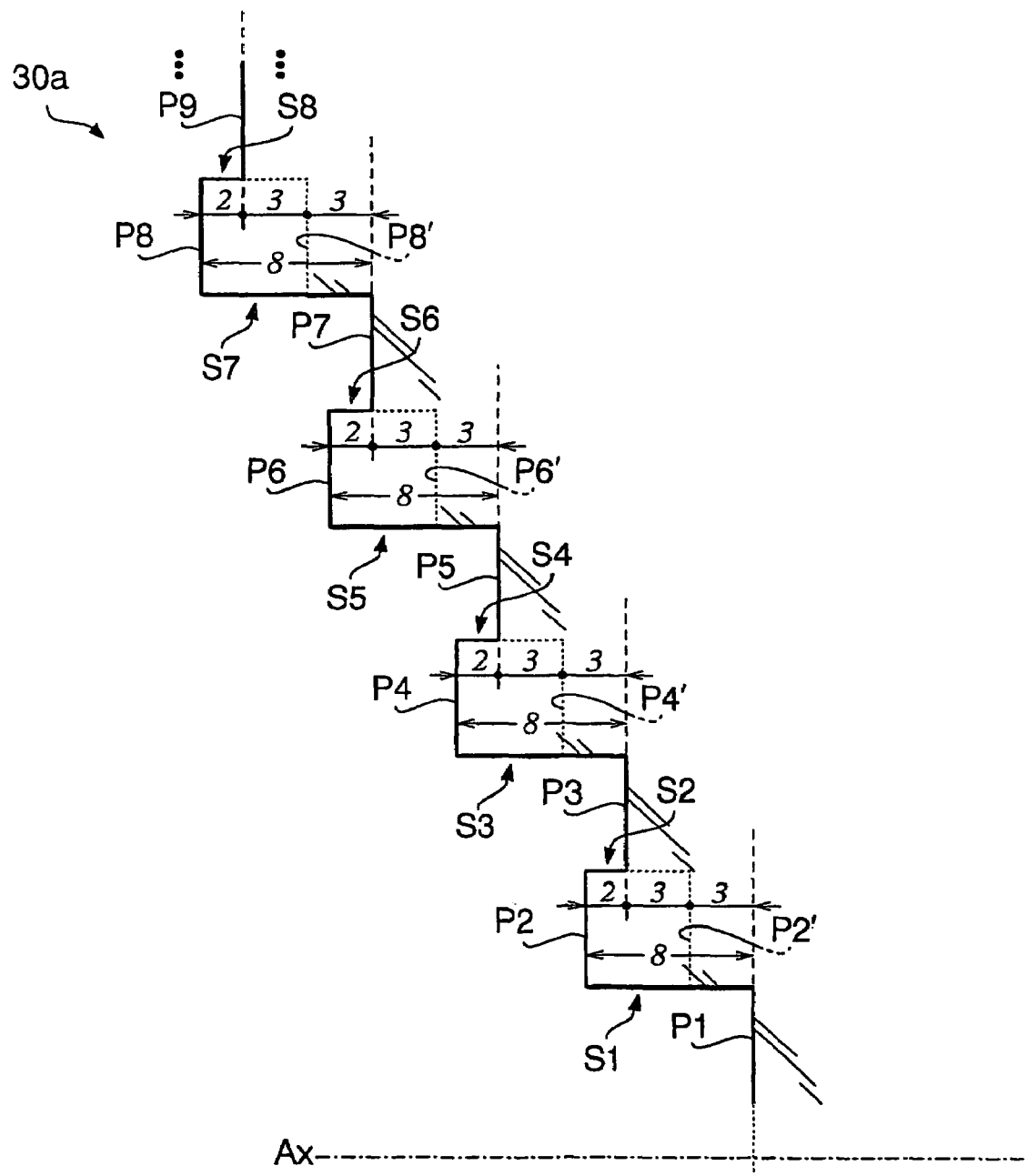
FIG. 4 shows an example of a configuration of the diffracting structure.

Another example of a configurations with regard to the diffracting structure within the first region 31 will be described with reference to FIG. 4. FIG. 4 shows a cross-sectional shape of the diffracting structure of the objective lens 30 when it is cut by a plane including the optical axis of the objective lens 30. FIG. 4 is an enlarged view of the diffracting structure within the first region 31.

As shown in FIG. 4, the diffracting structure includes a plurality of ring-shaped refractive surfaces P1, P2, P3, P4, P5, P6, P7, P8, P9 . . . Between adjacent refractive surfaces, steps S1, S2, S3, S4, S5, S6, S7, S8 . . . are formed.

The diffracting structure shown in FIG. 4 is configured such that, at each step between adjacent refractive surfaces, the additional optical path length added in the outer refractive surface with respect to the inner refractive surface is substantially equal to $-8\lambda_1$ ($\lambda_1$: wavelength of the first laser beam) or $2\lambda1$. For example, as shown in FIG. 4, the additional optical path length added in the refractive, surface P2 with respect to the refractive surface P1 is substantially equal to $-8\lambda_1$. The additional optical path lengths of $-8\lambda_1$ and $2\lambda_1$ are repeated in the entire first region 31. The additional optical path length (or the optical path difference) added by the outer refractive surface of adjacent refractive surfaces is negative when the outer refractive surface is situated on the light source side (i.e., a left side in FIG. 4) with respect to the inner refractive surface of the adjacent refractive surfaces. Further, the additional optical path length is positive when the outer refractive surface of the adjacent refractive surfaces is situated on an optical disc side (i.e., a right side in FIG. 4) with respect to the inner refractive surface of the adjacent refractive surfaces.

The above mentioned diffracting structure shown in FIG. 4 has the advantage equal to or better than that provided by another diffracting structure in which an optical path difference for the first laser beam given at each step is substantially equal to $-3\lambda_1$ (hereafter, this diffracting structure having the optical path difference of $-3\lambda_1$ is referred to as a comparative diffracting structure α) or in which an optical path difference given at each step is substantially equal to $-6\lambda_1$.

For making a comparison, the comparative diffracting structure a is also indicated in FIG. 4 by a dotted line. More specifically, the comparative diffracting structure a has a plurality of ring-shaped refractive surfaces P1, P2', P3, P4', P5, P6',P7, P8', P9 . . . . AT each step between adjacent refractive surfaces, the comparative diffracting structure a gives the additional optical path length of $-2\lambda_2$ ($\lambda_2$: wavelength of the second laser beam) to the second laser beam. Therefore, the comparative diffracting structure a provides high usage efficiency of light for the second laser beam.

However, the comparative diffracting structure a gives the additional optical path length of $-1.5\lambda_3$ ($\lambda_3$: wavelength of the third laser beam) to the third laser beam, by which the third laser beam is divided into first order diffracted light and second order diffracted light. Consequently, the usage efficiency of the third laser beam is lowered to about 40%.

In comparison with the comparative diffracting structure α, the diffracting structure shown in FIG. 4 has the refractive surfaces P2, P4, P6 and P8, which additionally give the optical path length of about $-5\lambda_1$ for the first laser beam with respect to the refractive surfaces P2', P4', P6' and P8', respectively. That is, the first region 31 is configured such that every other refractive surface is shifted by the optical path length of $-5\lambda_1$ with respect to the comparative diffracting structure a. The refractive surfaces P2, P4, P6 and P8 in the diffracting structure additionally give the optical path length of about $-3\lambda_2$ for the second laser beam with respect to the refractive surfaces P2', P4', P6' and P8', respectively. Also, The refractive surfaces P2, P4, P6 and P8 in the diffracting structure additionally give the optical path length of about $-2.5\lambda_3$ for the third laser beam with respect to the refractive surfaces P2', P4', P6' and P8', respectively.

With this structure, at each of steps S1, S3, S5 and S7 between the refractive surfaces P1 and P2, P3 and P4, P5 and P6, and P7 and P8, the additional optical path length of about $-8\lambda_1$ is given to the first laser beam, the additional optical path length of about $-5\lambda_2$ (i.e. $-2\lambda_2$ (given in the case of the structure α)+$-3\lambda_2$ (additionally given by the refractive surface P2, P4, . . . )=$-5\lambda_2$) is given to the second laser beam, and the additional optical path length of about $-4\lambda_3$ (i.e., $-1.5\lambda_3$ (given in the case of the structure α)+$-2.5\lambda_3$ (additionally given by the refractive surface P2, P4, . . . )=$-4\lambda_3$) is given to the third laser beam. Accordingly, the high usage efficiency of light for the third laser beam is attained.

The diffracting structure shown in FIG. 4 can be regarded as a diffraction grating which provides the function of using sixth order diffracted light, fourth order diffracted light, and the third order diffracted light for the first, second and third laser beams, respectively. In this case, the diffraction grating is provided with a diffracting zone formed by two kinds of regions. The step S2 formed between a pair of refractive surfaces P1 and P2 and a pair of refractive surfaces P3 and P4 (and the step S4, S6, S8) gives the optical path difference of about $-6\lambda_1$ to the first laser beam, the optical path difference of about $-4\lambda_2$ to the second laser beam, and the optical path difference of about $-3\lambda_3$ to the third laser beam. It is also understood from this explanation that the diffracting structure shown in FIG. 4 provides high diffraction efficiency for each of the first, second and third laser beams.

Although in the above explanation the diffracting structure shown in FIG. 4 is formed on the entire first region 31 of the first surface 30a of the objective lens 30, the diffracting structure shown in FIG. 4 may be formed in a portion of the first region 31.

Although, in the above mentioned example shown in FIG. 4, the diffracting structure has repetitions of the two kinds of regions generating the additional optical path lengths of $-8\lambda_1$ and $2\lambda_1$, the diffracting structure may alternatively be configured to have repetitions of two kinds of regions generating additional optical path lengths of $8\lambda_1$ and $-2\lambda_1$. Such a diffracting structure also attains the advantage provided by the diffracting structure shown in FIG. 4.

The diffracting structure within the second region 32 and the third region 33 may have the structure similar to the above mentioned two kinds of examples of the first region 31.

The diffracting structure within the second region 32 is configured such that the first and second laser beams are converged on the data recording layers of the optical discs D1 and D2, respectively, with aberrations being substantially equal to zero. More specifically, the diffracting structure within the second region 32 is configured such that the diffraction order at which the diffraction efficiency for the first laser beam is maximized is a third order, and the diffraction order at which the diffraction efficiency for the second laser beam is maximized is a second order.

With this structure, a wavefront of the third laser beam passed through the second region 32 does not coincide with a wavefront of the third laser beam passed through the first region 31. Therefore, the second region 32 does not contribute to the formation of the beam spot for the third laser beam.

The third region 33 is formed when the following condition (4) or condition (5) is satisfied.

$$f1 \times NA1 > f2 \times NA2 \qquad (4)$$

$$f1 \times NA1 < f2 \times NA2 \qquad (5)$$

In the conditions (4) and (5), f1 represents a focal length of the objective lens 30 when the optical disc D1 is used, f2 represents the focal length of the objective lens 30 when the optical disc D2 is used.

The diffracting structure formed when the condition (4) is satisfied is configured such that the first laser beam is properly converged on the data recording layer of the optical disc D1 with aberrations being substantially equal to zero. The third region 33 does not contribute to the formation of the beam spot for the second laser beam. More specifically, the third region 33 is configured such that the diffraction order at which the diffraction efficiency for the first laser beam is maximized in the third region 33 is different from the diffraction order at which the diffraction efficiency for the first laser beam is maximized in the second region 32. The third region 33 is blazed so that the diffraction efficiency for the first laser beam is maximized.

The diffracting structure formed when the condition (5) is satisfied is configured such that the second laser beam is properly converged on the data recording layer of the optical disc D2 with aberrations being substantially equal to zero. The third region 33 does not contribute to the formation of the beam spot for the first laser beam. More specifically, the third region 33 is configured such that the diffraction order at which the diffraction efficiency for the second laser beam is maximized in the third region 33 is different from the diffraction order at which the diffraction efficiency for the second laser beam is maximized in the second region 32. The third region 33 is blazed so that the diffraction efficiency for the second laser beam is maximized.

By thus configuring the first, second and third regions 31–33, numerical apertures (NA1, NA2, NA3) suitable for recording data to and/or reproducing data from the optical disc D1, D2 and D3, respectively, are attained.

When the objective lens 30 having the above mentioned diffracting structure is situated along the reference axis of the optical pick-up 100, the first and second laser beams are converged on the data recording layers of the optical discs D1 and D2, respectively, with the aberrations being substantially equal to zero. However, if the objective lens 30 is shifted from the reference axis due to the tracking operation, off-axis light is incident on the objective lens 30, which causes aberrations including a coma.

Tolerance to the aberrations becomes narrower as the NA required for the optical disc increases. For this reason, the optical pick-up 100 is configured such that the collimated laser beam is incident on the objective lens 30 when the optical disc D1 or D2 is used so as to suppress the aberrations caused when the objective lens 30 shifts from the reference axis due to the tracking operation.

More specifically, the objective lens 30 is configured to satisfy the following conditions (1) and (2):

$$-0.02 < f1 \times M1 < 0.02 \quad (1)$$

$$-0.02 < f2 \times M2 < 0.02 \quad (2)$$

where M1 represents magnification of the objective lens 30 when the optical disc D1 is used, and M2 represents magnification of the objective lens 30 when the optical disc D2 is used.

By configuring the objective lens 30 to satisfy the conditions (1) and (2), the aberrations such as the coma and astigmatism caused when the tracking operation is performed are sufficiently suppressed.

In this embodiment, when the optical disc D1 is used, the light source 10A and the coupling lens 20A is located so that the magnification of the objective lens 30 is substantially equal to zero. Further, when the optical disc D2 is used, the light source 10B and the coupling lens 20B is located so that the magnification of the objective lens 30 is substantially equal to zero. That is, in this embodiment each of the coupling lenses 20A and 20B functions as a collimator lens.

When the objective lens 30 is designed to effectively suppress the aberrations caused when each of the optical discs D1 and D2 is used, it becomes difficult to sufficiently suppress the spherical aberration caused when the optical disc D3 is used. For this reason, the optical pick-up 100 is configured such that when the optical disc D3 is used, the diverging beam is incident on the objective lens 30 as shown in FIG. 2C.

More specifically, the objective lens 30 is configured to satisfy a condition (3):

$$-0.29 < f3 \times M3 < -0.19 \quad (3)$$

where f3 represents a focal length of the objective lens 30 when the optical disc D3 is used, M3 represents magnification of the objective lens 30 when the optical disc D3 is used.

By configuring the objective lens 30 to satisfy the condition (3), the spherical aberration caused when the optical disc D3 is used is sufficiently suppressed.

With the above mentioned configuration, the beam spots suitable for recording data to and/or reproducing data from the optical discs D1, D2 and D3 are formed on data recording layers of the optical discs D1, D2 and D3, respectively.

In this embodiment, the following relationship (6) and (7) are satisfied:

$$\lambda_1/(n_1-1):\lambda_3/(n_3-1) \approx 1:2 \quad (6)$$

$$\lambda_1/(n_1-1):\lambda_2/(n_2-1) \approx 3:5 \quad (7)$$

where $\lambda_1$ represents the wavelength of the first laser beam, $n_1$ represents a refractive index of the objective lens 30 for the first laser beam, $\lambda_2$ represents the wavelength of the second laser beam, $n_2$ represents a refractive index of the objective lens 30 for the second laser beam, $\lambda_3$ represents the wavelength of the third laser beam, and $n_3$ represents a refractive index of the objective lens 30 for the third laser beam.

When the relationship (6) holds, if the diffraction order for the first laser beam ($\lambda1$) is set at the sixth order and if the diffraction order for the third laser beam ($\lambda3$) is set at the third order, it becomes impossible to correct the spherical aberration by a diffracting lens structure for both of the first and third laser beams. More specifically, because the diffracting lens structure has the same power for both of the sixth order diffracted light of the laser beam having the wavelength of $\lambda1$ and the third order diffracted light of the light beam having the wavelength of $\lambda3$, the spherical aberration, which changes between the optical disc D1 and the optical disc D3 due to the change of the refractive index (caused by a difference of the wavelengths of the first and third laser beams) and the difference of the thicknesses of the cover layers of the optical discs D1 and D3, can not be corrected.

For this reason, in this embodiment, when each of the optical discs D1 and D2, each of which has a high recording density and requires the strict tolerance to the aberrations, is used, the aberrations are substantially completely corrected by the diffracting structure formed on the first surface 30a of the objective lens 30. On the other hand, when the optical disc D3 is used, the aberrations are corrected by utilizing the diffracting structure and the adjustment of the magnification of the objective lens 30.

In other words, according to the embodiment, even though a relationship among the wavelengths of the first, second and third laser beams is in a condition where the correction of the aberrations by the diffracting structure for all of the optical discs D1, D2 and D3 is very difficult, the suitable beam spot can be formed for all of the optical discs D1, D2 and D3.

The objective lens 30 (or the optical pick-up 100) can be represented as a lens (or an apparatus) compatible for optical discs having the relationship (6).

Hereafter, three concrete examples of optical pick-ups according to the embodiment will be described. In the following examples, the thickness of the cover layers of the optical discs D1 and D2 are 0.6 mm, and the thickness of the cover layer of the optical disc D3 is 1.2 mm.

FIRST EXAMPLE

The optical pick-up 100 according to a first example has the configuration shown in FIGS. 1 and 2. Performance specifications of the objective lens 30 according to the first example are shown in Table 1.

TABLE 1

|  | First laser beam | Second laser beam | Third laser beam |
|---|---|---|---|
| Design wavelength | 405 nm | 657 nm | 785 nm |
| f Focal length | 3.004 mm | 3.108 mm | 3.130 mm |
| NA | 0.649 | 0.602 | 0.451 |
| magnification | 0.000 | 0.000 | −0.074 |

In Table 1 (and in the following similar Tables), the design wavelength is a wavelength suitable for the recordation/reproduction of the optical disc, f represents a focal length (unit: mm) of the objective lens 30, NA represents the numerical aperture. In Table 1, the performance specifications are indicated with regard to each of the first laser beam (the optical disc D1), the second laser beam (the optical disc D2) and the third laser beam (the optical disc D3).

Table 2 shows a numerical configuration of the optical pick-up 100 when the optical disc D1 (the first laser beam) is used, Table 3 shows a numerical configuration of the optical pick-up 100 when the optical disc D2 (the second laser beam) is used, and Table 4 shows a numerical configuration of the optical pick-up 100 when the optical disc D3 (the third laser beam) is used.

TABLE 2

| Surface Number | r | d | n (405 nm) | n (657 nm) | n (785 nm) |
|---|---|---|---|---|---|
| #0 |  | 17.10 |  |  |  |
| #1 | 159.120 | 1.50 | 1.56023 | 1.54056 | 1.53665 |
| #2 | −10.730 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.43 |  |  |  |
| #7 (1st region) | 1.926 | 1.95 | 1.56023 | 1.54056 | 1.53665 |
| #7 (2nd region) | 1.926 |  |  |  |  |
| #7 (3rd region) | 1.910 |  |  |  |  |
| #8 | −8.600 | 1.54 |  |  |  |
| #9 | ∞ | 0.60 | 1.62231 | 1.57982 | 1.57326 |
| #10 | ∞ | — |  |  |  |

TABLE 3

| Surface Number | r | d | n (405 nm) | n (657 nm) | n (785 nm) |
|---|---|---|---|---|---|
| #0 |  | 16.10 |  |  |  |
| #1 | 111.180 | 1.50 | 1.56023 | 1.54056 | 1.53665 |
| #2 | −9.970 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.35 |  |  |  |
| #7 (1st region) | 1.926 | 1.95 | 1.56023 | 1.54056 | 1.53665 |
| #7 (2nd region) | 1.926 |  |  |  |  |
| #7 (3rd region) | 1.910 |  |  |  |  |
| #8 | −8.600 | 1.62 |  |  |  |
| #9 | ∞ | 0.60 | 1.62231 | 1.57982 | 1.57326 |
| #10 | ∞ | — |  |  |  |

TABLE 4

| Surface Number | r | d | n (405 nm) | n (657 nm) | n (785 nm) |
|---|---|---|---|---|---|
| #0 |  | 10.48 |  |  |  |
| #1 | −23.970 | 1.50 | 1.56023 | 1.54056 | 1.53665 |
| #2 | −6.960 | 3.87 |  |  |  |
| #3 | ∞ | 4.00 | 1.52972 | 1.51383 | 1.51062 |
| #4 | ∞ | 3.48 |  |  |  |
| #5 (1st region) | 1.926 | 1.95 | 1.56023 | 1.54056 | 1.53665 |
| #5 (2nd region) | 1.926 |  |  |  |  |
| #5 (3rd region) | 1.910 |  |  |  |  |
| #6 | −8.600 | 1.49 |  |  |  |
| #7 | ∞ | 1.20 | 1.62231 | 1.57982 | 1.57326 |
| #8 | ∞ | — |  |  |  |

In Tables 2–4, "surface number" represents a surface number of each surface of optical components in the optical pick-up 100 shown in FIGS. 2A–2C. In Table 2, a surface #0 represents the light source 10A, surfaces #1 and #2 represent a front surface (a light source side surface) and a rear surface (an objective lens side surface) of the coupling lens 20A, respectively, and surfaces #9 and #10 represent the cover layer and the data recording layer of the optical disc D1, respectively. In Table 3, a surface #0 represents the light source 10B, surfaces #1 and #2 represent a front surface (a light source side surface) and a rear surface (an objective lens side surface) of the coupling lens 20B, respectively, and surfaces #9 and #10 represent the cover layer and the recording layer of the optical disc D2, respectively.

In each of Tables 2 and 3, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and the second surface 30b of the objective lens 30, respectively.

In Table 4, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

In Tables 2–4 (and in the following similar Tables), "r" represents a radius of curvature (unit: mm) of each lens surface on the optical axis. "d" represents a thickness of a lens or a distance (unit: mm) from a lens surface to a next lens surface. "n" represents a refractive index which is indicated for each of wavelengths of the first, second and third laser beams.

As shown in Tables 2–4, the first surface 30a of the objective lens 30 includes the first, second and third regions 31, 32 and 33 which are defined by heights h (mm) from the optical axis (Ax) of the objective lens 30 as follows.

First region 31: $h \leq 1.53$
Second region 32: $1.53 < h \leq 1.87$
Third region 33: $1.87 < h \leq 1.95$ Each of the rear surface (#2) of the coupling lens 20A, the rear surface (#2) of the coupling lens 20B, the rear surface (#2) of the coupling lens 20C and the first and second surfaces 30a and 30b of the objective lens 30 is an aspherical surface. The aspherical surface is expressed by a following equation:

$$X(h) = \frac{ch^2}{1+\sqrt{1-(1+K)c^2h^2}} + A_4 h^4 + A_6 h^6 + A_8 h^8 + A_{10} h^{10} + A_{12} h^{12} + \ldots$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Table 5 shows the conical coefficient and aspherical coefficients of the rear surface (#2) of the coupling lens 20A and the first and second surfaces 30a and 30b (#7 and #8) of the objective lens 30 when the optical disc D1 (the first laser beam) is used. Table 6 shows the conical coefficient and aspherical coefficients of the rear surface (#2) of the coupling lens 20B and the first and second surfaces 30a and 30b (#7 and #8) of the objective lens 30 when the optical disc D2 (the second laser beam) is used. Table 7 shows the conical coefficient and aspherical coefficients of the rear surface (#2) of the coupling lens 20C and the first and second surfaces 30a and 30b (#5 and #6) of the objective lens 30 when the optical disc D3 (the third laser beam) is used.

where $P_2$, $P_4$ and $P_6$ are coefficients of second, fourth and sixth orders, h represents a height from the optical axis, m represents a diffraction order, and $\lambda$ represents a working wavelength. The optical path difference $\Phi(h)$ indicates a difference of an optical path length of a hypothetical ray of light which does not pass through the diffractive lens structure and an optical path length of a ray of light which is diffracted by the diffraction lens structure, at the height h from the optical axis. In other words, the optical path difference $\Phi(h)$ represents the additional optical path length of each ray of light which is diffracted by the diffractive lens structure. "m" represents the diffraction order at which the diffraction efficiency is maximized.

TABLE 5

| | | Surface No. | | | |
|---|---|---|---|---|---|
| | #2 | #7 (FIRST REGION) | #7 (SECOND REGION) | #7 (THIRD REGION) | #8 |
| K | 0.0000 | −0.6400 | −0.6400 | −0.6400 | 0.0000 |
| A4 | 6.8926E−05 | 1.3730E−03 | 1.0070E−03 | 1.4290E−03 | 1.8180E−02 |
| A6 | 4.5010E−07 | 9.5130E−05 | 5.4150E−04 | 1.4290E−04 | −4.1010E−03 |
| A8 | 2.5560E−09 | 1.5010E−05 | −1.9210E−04 | −1.3020E−04 | 5.8690E−04 |
| A10 | 1.5860E−11 | −2.7940E−06 | 4.5060E−05 | 3.7610E−05 | −4.0910E−05 |
| A12 | 0.0000E+00 | −6.9900E−07 | −5.9731E−06 | −6.7510E−06 | −4.3480E−07 |

TABLE 6

| | | Surface No. | | | |
|---|---|---|---|---|---|
| | #2 | #7 (FIRST REGION) | #7 (SECOND REGION) | #7 (THIRD REGION) | #8 |
| K | 0.0000 | −0.6400 | −0.6400 | −0.6400 | 0.0000 |
| A4 | 8.8885E−05 | 1.3730E−03 | 1.0070E−03 | 1.4290E−03 | 1.8180E−02 |
| A6 | 6.6760E−07 | 9.5130E−05 | 5.4150E−04 | 1.4290E−04 | −4.1010E−03 |
| A8 | 4.3250E−09 | 1.5010E−05 | −1.9210E−04 | −1.3020E−04 | 5.8690E−04 |
| A10 | 3.2340E−11 | −2.7940E−06 | 4.5060E−05 | 3.7610E−05 | −4.0910E−05 |
| A12 | 0.0000E+00 | −6.9900E−07 | −5.9731E−06 | −6.7510E−06 | −4.3480E−07 |

TABLE 7

| | | Surface No. | | | |
|---|---|---|---|---|---|
| | #2 | #5 (FIRST REGION) | #5 (SECOND REGION) | #5 (THIRD REGION) | #6 |
| K | 0.0000 | −0.6400 | −0.6400 | −0.6400 | 0.0000 |
| A4 | 6.9720E−05 | 1.3730E−03 | 1.0070E−03 | 1.4290E−03 | 1.8180E−02 |
| A6 | 1.3890E−06 | 9.5130E−05 | 5.4150E−04 | 1.4290E−04 | −4.1010E−03 |
| A8 | 2.4240E−08 | 1.5010E−05 | −1.9210E−04 | −1.3020E−04 | 5.8690E−04 |
| A10 | 5.5540E−10 | −2.7940E−06 | 4.5060E−05 | 3.7610E−05 | −4.0910E−05 |
| A12 | 0.0000E+00 | −6.9900E−07 | −5.9731E−06 | −6.7510E−06 | −4.3480E−07 |

In Tables 5–7 (and in the following similar Tables), a notation symbol E indicates that 10 is used as a radix and a right side value of E is used as an exponent.

The diffracting structure formed on the front surface 30a of the objective lens 30 is expressed by an optical path difference function $\Phi(h)$:

$$\Phi(h) = (P_2 h^2 + P_4 h^4 + P_6 h^6 + \ldots) \times m \times \lambda$$

Table 8 shows values of the coefficients of the optical path difference function Φ(h) applied to the diffracting structure formed on the first surface 30a of the objective lens 30.

TABLE 8

| coefficient | First Region 31 | Second Region 32 | Third Region 33 |
|---|---|---|---|
| P2 | −1.2120E−01 | −2.4240E−01 | 2.2810E+00 |
| P4 | −2.9270E−01 | −6.6180E−01 | −1.9130E+00 |
| P6 | −4.0100E−02 | −1.2540E−02 | −9.9810E−02 |
| P8 | 0.0000E+00 | −1.5000E−02 | −8.5980E−02 |
| P10 | 0.0000E+00 | 0.0000E+00 | 0.0000E+00 |
| P12 | 0.0000E+00 | 0.0000E+00 | 0.0000E+00 |

Table 9 shows the diffraction order m (at which the diffraction efficiency is maximized) in each of the first, second and third regions 31–33. Further, the diffraction orders m are indicated for each of the first, second and third laser beams in Table 9.

TABLE 9

| M | First laser | Second Laser | Third Laser |
|---|---|---|---|
| First region 31 | 6th | 4th | 3rd |
| Second region 32 | 3rd | 2nd | — |
| Third region 33 | 1st | — | — |

SECOND EXAMPLE

Hereafter, the optical pick-up 100 according to a second example will be described. The optical pick-up 100 according to the second example has a configuration substantially the same as that of the first example. That is, the numerical data shown in Tables 1–9 is also applied to the second example. Only the diffracting structure formed within the first surface 30a of the objective lens 30 is different from that of the first example.

The objective lens 30 according to the second example has the diffracting structure shown in FIG. 4. Table 10 shows numerical data of the diffracting structure formed on the first surface 30a of the objective lens 30.

TABLE 10

| Annular zone No. | Hs | He | La (unit: $\lambda_1$) From annular zone #0 | From adjacent annular zone | |
|---|---|---|---|---|---|
| #0 | 0.000 | 0.977 | 0 | | First Region |
| #1 | 0.977 | 1.205 | −8 | −8 | |
| #2 | 1.205 | 1.346 | −6 | 2 | |
| #3 | 1.346 | 1.449 | −14 | −8 | |
| #4 | 1.449 | 1.530 | −12 | 2 | |
| #5 | 1.530 | 1.601 | −15 | −3 | Second Region |
| #6 | 1.601 | 1.661 | −18 | −3 | |
| #7 | 1.661 | 1.713 | −21 | −3 | |
| #8 | 1.713 | 1.759 | −24 | −3 | |
| #9 | 1.759 | 1.801 | −27 | −3 | |
| #10 | 1.801 | 1.839 | −30 | −3 | |
| #11 | 1.839 | 1.870 | −33 | −3 | |
| #12 | 1.870 | 1.905 | −36 | −3 | Third region |
| #13 | 1.905 | 1.913 | −37 | −1 | |
| #14 | 1.913 | 1.921 | −38 | −1 | |
| #15 | 1.921 | 1.928 | −39 | −1 | |
| #16 | 1.928 | 1.936 | −40 | −1 | |
| #17 | 1.936 | 1.943 | −41 | −1 | |
| #18 | 1.943 | 1.950 | −42 | −1 | |

As shown in Table 10, the first region 31 has the annular zones #0–#4, the second region 32 has the annular zones #5–#11, and the third region 33 has the annular zones #12–#18. In Table 10, "Hs" represents a height, from the optical axis, at which the annular zone starts. "He" represents a height, from the optical axis, at which the annular zone ends. For example, the annular zone #18 is formed within a range of height h from 1.943 mm to 1.950 mm.

"La" represents an additional optical path length added in each annular zone. "La" is indicated, for each of the annular zones, with respect to the annular zone #0 and with respect to an adjacent annular zone. The additional optical path length La is defined as a multiple with respect to $\lambda_1$ ($\lambda_1$ is the wavelength of the first laser beam).

Given that the diffraction efficiency for the first laser beam provided by the objective lens 30 according to the second example is 100%, the diffracting structure provides the diffraction efficiency of 87.2% for the second laser beam, and provides the diffraction efficiency of 99.9% for the third laser beam. That is, in this example high diffraction efficiency is attained. Therefore, the beam spot having a sufficiently large amount of light is formed on each of the data recording layers of the optical discs D1, D2 and D3.

With regard to the objective lens 30 in the optical pick-up 100 according to the first and second example, f1×M1 is 0.000, f2×M2 is 0.000, and f3×M3 is −0.232. Therefore, the conditions (1), (2) and (3) are satisfied. Further, since f1×NA1 is 1.95 and f2×NA2 is 1.87, the condition (4) is also satisfied. Therefore, the objective lens 30 according to the first and second examples has the third region 33 configured such that the diffraction order at which the diffraction efficiency for the first laser beam is maximized in the third region 33 is different from the diffraction order at which the diffraction efficiency for the first laser beam is maximized in the second region 32.

As can be seen from Tables 1 and 2, $\lambda_1/(n1-1)$ : $\lambda_3/(n3-1)$ is 1:2, and $\lambda_1/(n_1-1)$:$\lambda_2/(n_2-1)$ is 3:5. Therefore, the relationships (6) and (7) are satisfied.

FIG. 5 is a graph illustrating the spherical aberration caused in the optical pick-up 100 of the first and second examples when the first laser beam passes through the objective lens 30 (i.e., when the optical disc D1 is used). FIG. 6 is a graph illustrating the spherical aberration caused in the optical pick-up 100 of the first and second examples when the second laser beam passes through the objective lens 30 (i.e., when the optical disc D2 is used). FIG. 7 is a graph illustrating the spherical aberration caused in the optical pick-up 100 of the first and second examples when the third laser beam passes through the objective lens 30 (i.e., when the optical disc D3 is used).

As shown in FIGS. 5–7, according to the first example or the second example, the spherical aberration is sufficiently corrected for each of the optical discs D1, D2 and D3.

Therefore, the beam spots suitable for the recording and/or reproducing operation of optical discs D1, D2 and D3 are formed on the data recording layers of the optical discs D1, D2 and D3, respectively.

THIRD EXAMPLE

The optical pick-up 100 according to a third example will be described. The configuration of the optical pick-up 100 according to the third example is shown in FIG. 1. In this example, configurations of the coupling lens 20A and the coupling lens 20B are the same. Therefore, the coupling lens 20A and the coupling lens 20B are referred to as a coupling lens 200A_1 and a coupling lens 200A_2, respectively, in this example. FIG. 8A shows a configuration of the optical pick-up 100 when the optical disc D1 is used, FIG. 8B shows a configuration of the optical pick-up 100 when the optical disc D2 is used, and FIG. 8C shows a configuration of the optical pick-up 100 when the optical disc D3 is used.

Performance specifications of the objective lens 30 according to the third example are shown in Table 11.

TABLE 11

|  | First laser beam | Second laser beam | Third laser beam |
|---|---|---|---|
| Design wavelength | 405 nm | 657 nm | 785 nm |
| f Focal length | 3.000 mm | 3.108 mm | 3.121 mm |
| NA | 0.650 | 0.627 | 0.500 |
| magnification | 0.000 | 0.000 | −0.086 |

As shown in Table 11, a relatively high NA is applied to use the optical disc D2. Therefore, in this example, the third region 33 is not formed on the objective lens 30.

Table 12 shows a numerical configuration of the optical pick-up 100 when the optical disc D1 (the first laser beam) is used, Table 13 shows a numerical configuration of the optical pick-up 100 when the optical disc D2 (the second laser beam) used, and Table 14 shows a numerical configuration of the optical pick-up 100 when the optical disc D3 (the third laser beam) is used.

TABLE 12

| Surface Number | r | d | n (405 nm) | n (657 nm) | n (785 nm) |
|---|---|---|---|---|---|
| 0 |  | 17.11 |  |  |  |
| 1 | 97.680 | 1.50 | 1.52469 | 1.50645 | 1.50322 |
| 2 | −10.400 | 1.00 |  |  |  |
| 3 | ∞ | 4.00 | 1.52972 | 1.51383 | 1.51062 |
| 4 | ∞ | 1.00 |  |  |  |
| 5 | ∞ | 4.00 | 1.52972 | 1.51383 | 1.51062 |
| 6 | ∞ | 3.08 |  |  |  |
| 7 1st region | 1.847 | 1.95 | 1.52469 | 1.50645 | 1.50322 |
| 7 2nd region | 1.847 |  |  |  |  |
| 8 | −6.064 | 1.57 |  |  |  |
| 9 | ∞ | 0.60 | 1.62231 | 1.57982 | 1.57326 |
| 10 | ∞ | — |  |  |  |

TABLE 13

| Surface Number | r | d | n (405 nm) | n (657 nm) | n (785 nm) |
|---|---|---|---|---|---|
| 0 |  | 17.74 |  |  |  |
| 1 | 97.680 | 1.50 | 1.52469 | 1.50645 | 1.50322 |
| 2 | −10.400 | 1.00 |  |  |  |
| 3 | ∞ | 4.00 | 1.52972 | 1.51383 | 1.51062 |
| 4 | ∞ | 1.00 |  |  |  |
| 5 | ∞ | 4.00 | 1.52972 | 1.51383 | 1.51062 |
| 6 | ∞ | 3.00 |  |  |  |
| 7 1st region | 1.847 | 1.95 | 1.52469 | 1.50645 | 1.50322 |
| 7 2nd region | 1.847 |  |  |  |  |
| 8 | −6.064 | 1.65 |  |  |  |
| 9 | ∞ | 0.60 | 1.62231 | 1.57982 | 1.57326 |
| 10 | ∞ | — |  |  |  |

TABLE 14

| Surface Number | r | d | n (405 nm) | n (657 nm) | n (785 nm) |
|---|---|---|---|---|---|
| 0 |  | 9.81 |  |  |  |
| 1 | −23.870 | 1.50 | 1.52469 | 1.50645 | 1.50322 |
| 2 | −6.430 | 1.29 |  |  |  |
| 3 | ∞ | 4.00 | 1.52972 | 1.51383 | 1.51062 |
| 4 | ∞ | 3.10 |  |  |  |
| 5 1st region | 1.847 | 1.95 | 1.52469 | 1.50645 | 1.50322 |
| 5 2nd region | 1.847 |  |  |  |  |
| 6 | −6.064 | 1.55 |  |  |  |
| 7 | ∞ | 1.20 | 1.62231 | 1.57982 | 1.57326 |
| 8 | ∞ | — |  |  |  |

In Tables 12–14, surface numbers represents a surface number of each surface of optical components in the optical pick-up 100 shown in FIGS. 8A–8C. In Table 12, a surface #0 represents the light source 10A, surfaces #1 and #2 represent a front surface (a light source side surface) and a rear surface (an objective lens side surface) of the coupling lens 200A_1, respectively, and surfaces #9 and #10 represent the cover layer and the data recording layer of the optical disc D1, respectively. In Table 13, a surface #0 represents the light source 10B, surfaces #1 and #2 represent a front surface (a light source side surface) and a rear surface (an objective lens side surface) of the coupling lens 200A_2, respectively, and surfaces #9 and #10 represent the cover layer and the recording layer of the optical disc D2, respectively.

In each of Tables 12 and 13, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and the second surface 30b of the objective lens 30, respectively.

In Table 14, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

As shown in Tables 12–14, the first surface 30a of the objective lens 30 includes the first and second regions 31 and 32 which are defined by heights h (mm) from the optical axis (Ax) of the objective lens 30 as follows.

First region 31: h≦1.72

Second region 32: 1.72<h≦1.95

Each of the rear surface (#2) of the coupling lens. 200A_1 (200A_2), the rear surface (#2) of the coupling lens 20C and the first and second surfaces 30a and 30b of the objective lens 30 is an aspherical surface.

Table 15 shows the conical coefficient and aspherical coefficients of the rear surface (#2) of the coupling lens 200A_1 (200A_2) and the first and second surfaces 30a and 30b (#7 and #8) of the objective lens 30 when the optical disc D1 or D2 (the first laser beam or second laser beam) is used. Table 16 shows the conical coefficient and aspherical coefficients of the rear surface (#2) of the coupling lens 20C and the first and second surfaces 30a and 30b (#5 and #6) of the objective lens 30 when the optical disc D3 (the third laser beam) is used.

TABLE 15

| | Surface No. | | |
|---|---|---|---|
| | #7 | #7 | |
| | (FIRST | (SECOND | |
| #2 | REGION) | REGION) | #8 |
| K | 0.0000 | −0.6000 | −0.6000 | 0.0000 |
| A4 | 8.0470E−05 | −3.4480E−04 | −1.6090E−03 | 2.2500E−02 |
| A6 | 5.5160E−07 | −7.8740E−05 | 1.5540E−03 | −5.2690E−03 |
| A8 | 2.2520E−09 | −5.1610E−05 | −9.1150E−04 | 1.1130E−03 |
| A10 | 0.0000E+00 | 2.4710E−05 | 2.4247E−04 | −1.9685E−04 |
| A12 | 0.0000E+00 | −6.0227E−06 | −2.7938E−05 | 1.5617E−05 |

TABLE 16

| | Surface No. | | |
|---|---|---|---|
| | #5 | #5 | |
| | (FIRST | (SECOND | |
| #2 | REGION) | REGION) | #6 |
| K | 0.0000 | −0.6000 | −0.6000 | 0.0000 |
| A4 | 9.2650E−05 | −3.4480E−04 | −1.6090E−03 | 2.2500E−02 |
| A6 | 2.1470E−06 | −7.8740E−05 | 1.5540E−03 | −5.2690E−03 |
| A8 | 5.1500E−08 | −5.1610E−05 | −9.1150E−04 | 1.1130E−03 |
| A10 | 0.0000E+00 | 2.4710E−05 | 2.4247E−04 | −1.9685E−04 |
| A12 | 0.0000E+00 | −6.0227E−06 | −2.7938E−05 | 1.5617E−05 |

Table 17 shows values of the coefficients of the optical path difference function Φ(h) applied to the diffracting structure formed on the first surface 30a of the objective lens 30.

TABLE 17

| coefficient | First Region 31 | Second Region 32 |
|---|---|---|
| P2 | 1.3540E+00 | 2.7080E+00 |
| P4 | −3.1330E−01 | −7.9330E−01 |
| P6 | −5.0130E−02 | 1.2850E−02 |
| P8 | 0.0000E+00 | −1.9180E−02 |
| P10 | 0.0000E+00 | 0.0000E+00 |
| P12 | 0.0000E+00 | 0.0000E+00 |

Table 18 shows the diffraction order m (at which the diffraction efficiency is maximized) in each of the first and second regions 31 and 32. Further, the diffraction orders m are indicated for each of the first, second and third laser beams in Table 18.

TABLE 18

| m | First Laser | Second Laser | Third Laser |
|---|---|---|---|
| First region 31 | $6^{th}$ | $4^{th}$ | $3^{rd}$ |
| Second region 32 | $3^{rd}$ | $2^{nd}$ | — |

Table 19 shows numerical data of the diffracting structure formed on the first surface 30a of the objective lens 30.

TABLE 19

| | | | La (unit: $\lambda_1$) | | |
|---|---|---|---|---|---|
| Annular zone No. | Hs | He | From annular zone #0 | From annular zone #0 | |
| 0 | 0.000 | 0.579 | 0 | | First |
| 1 | 0.579 | 0.940 | 8 | 8 | Region |
| 2 | 0.940 | 1.489 | 6 | −2 | |
| 3 | 1.489 | 1.636 | −2 | −8 | |
| 4 | 1.636 | 1.720 | 0 | 2 | |
| 5 | 1.720 | 1.752 | 0 | 0 | Second |
| 6 | 1.752 | 1.816 | −3 | −3 | Region |
| 7 | 1.816 | 1.868 | −6 | −3 | |
| 8 | 1.868 | 1.912 | −9 | −3 | |
| 9 | 1.912 | 1.950 | −12 | −3 | |

As shown in Table 19, the first region 31 has the annular zones #0–#4, and the second region 32 has the annular zones #5–#9. In Table 19, "Hs" represents a height, from the optical axis, at which the annular zone starts. "He" represents a height, from the optical axis, at which the annular zone ends. For example, the annular zone #9 is formed within a range of height h from 1.912 mm to 1.950 mm.

"La" represents an additional optical path length added in each annular zone. "La" is indicated for each of the annular zones with respect to the annular zone #0 and with respect to an adjacent annular zone. The additional optical path length La is defined as a multiple with respect to $\lambda_1$ ($\lambda_1$ is the wavelength of the first laser beam).

Given that the diffraction efficiency for the first laser beam provided by the objective lens 30 according to the second example is 100%, the diffracting structure provides the diffraction efficiency of 87.2% for the second laser beam, and provides the diffraction efficiency of 98.8% for the third laser beam. That is, high diffraction efficiency is attained. Therefore, the beam spot having a very large amount of light is formed on each of the data recording layers of the optical disks D1, D2 and D3.

With regard to the objective lens 30 in the optical pick-up 100 according to the third example, f1×M1 is 0.000, f2×M2 is 0.000, and f3×M3 is −0.268. Therefore, the conditions (1), (2) and (3) are satisfied. Further, f1×NA1 is 1.95 and f2×NA2 is 1.95 (i.e., the conditions (4) and (5) are not satisfied), and therefore the third region is not formed on the objective lens 30.

As can be seen from Tables 11 and 12, λ1/(n1−1): λ3/(n3−1) is 1:2, and $\lambda_1/(n_1-1):\lambda_2/(n_2-1)$ is 3:5. Therefore, the relationships (6) and (7) are satisfied.

Figure 11:
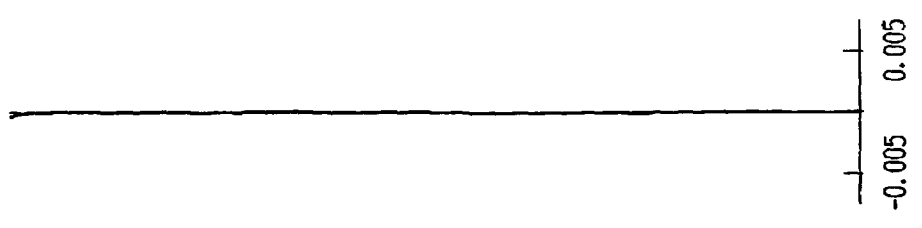
FIG. 11 is a graph illustrating a spherical aberration caused in the optical pick-up of the third example when the third laser beam passes through the objective lens.
Figure 10:
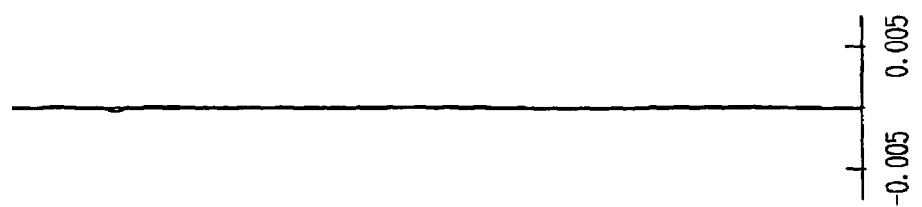
FIG. 10 is a graph illustrating a spherical aberration caused in the optical pick-up of the third example when the second laser beam passes through the objective lens.
Figure 9:
FIG. 9 is a graph illustrating a spherical aberration caused in the optical pick-up of the third example when the first laser beam passes through the objective lens.

FIG. 9 is a graph illustrating the spherical aberration caused in the optical pick-up 100 of the third example when the first laser beam passes through the objective lens 30 (i.e., when the optical disc D1 is used). FIG. 10 is a graph illustrating the spherical aberration caused in the optical pick-up 100 of the third example when the second laser beam passes through the objective lens 30 (i.e., when the optical disc D2 is used). FIG. 11 is a graph illustrating the spherical aberration caused in the optical pick-up 100 of the third example when the third laser beam passes through the objective lens 30 (i.e., when the optical disc D3 is used).

As shown in FIGS. 9–11, according to the third example, the spherical aberration is sufficiently corrected for each of the optical discs D1, D2 and D3. Therefore, the beam spots suitable for the recording and/or reproducing operation of optical discs D1, D2 and D3 are formed on the data recording layers of the optical discs D1, D2 and D3, respectively.

Although the present invention has been described in considerable detail with reference to certain preferred embodiments thereof, other embodiments are possible.

In the above mentioned embodiment, the diffracting structure is formed on the first surface 30a of the objective lens 3O. However, the diffracting structure may be formed on the second surface 30b of the objective lens 30 or both of the first and second surfaces 30a and 30b of the objective lens 30. The numerical configurations have been described in the first though third examples by way of example. Other numerical configurations are also possible.

Although in the above mentioned embodiment, the diffracting structure is formed on the objective lens 30, the diffracting structure may alternatively be formed on a separate optical element. That is, the optical pick-up may have a diffraction element having a diffracting structure (which is the same as that shown in one of the first, second and third examples) between the light source and the objective lens. In this case, the objective lens is not required to have the diffracting structure.

Figure 12:
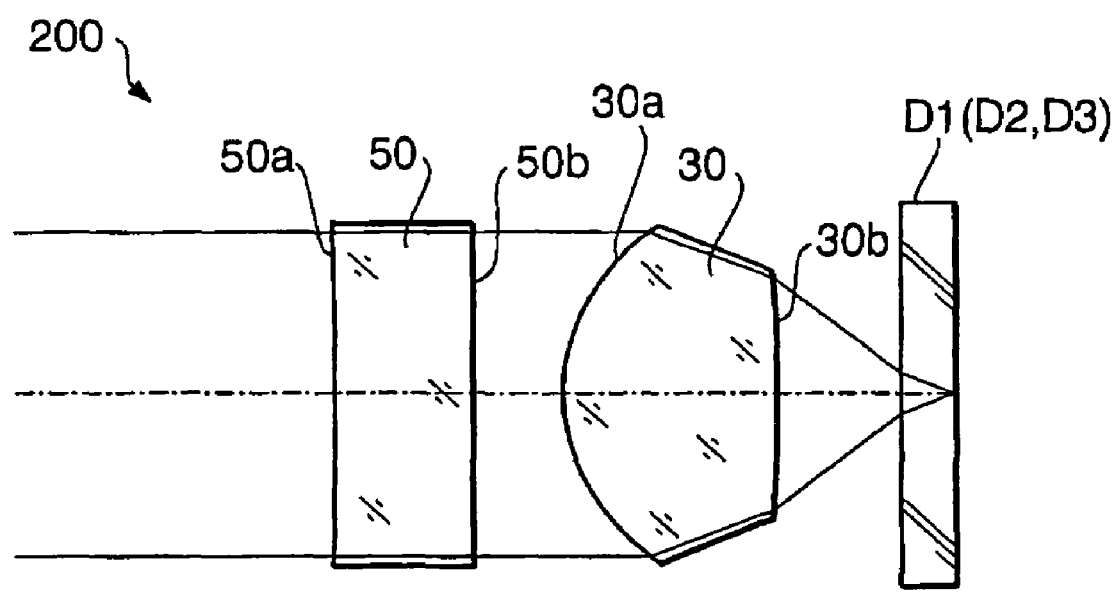
FIG. 12 shows a configuration of another example of an optical pick-up having a separate diffraction element.

FIG. 12 shows a configuration of an optical pick-up 200 of this type. FIG. 12 shows the configuration of the optical pick-up 200 when the optical disc D1 is used. Since a general configuration of the optical pick-up 200 is substantially the same as that shown in FIG. 1, in FIG. 12 the light source 10A, the coupling lens 20A, the beam splitters 41 and 42 are omitted for the sake of simplicity. As shown in FIG. 12, a diffraction element 50 is located on the light source side of the objective lens 30.

The diffraction element 50 has a first surface 50a which is located on the light source side and a second surface 50b. On the first surface 50a, the diffracting structure is formed. The second surface 50b is a flat surface. The objective lens 30 has the first surface 30a (which does not has the diffracting structure) and the second surface 30b which are aspherical surfaces as described in one of the first, second and third examples. It is noted that a combination of the diffraction element 50 and the objective lens 30 is also used in the optical pick-up 200 when the optical disc D2 or D3 is used. The advantage of the optical pick-up 100 described above can also be attained by the optical pick-up 200.

The present disclosure relates to the subject matter contained in Japanese Patent Application No. P2003-171467, filed on Jun. 17, 2003, which is expressly incorporated herein by reference in its entirety.

What is claimed is:

1. An objective lens for an optical pick-up which is used to record data to and/or to reproduce data from at least three types of optical discs by selectively using one of at least three light beams having different wavelengths, the at least three types of optical discs having at least two different thicknesses of cover layers, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm, and t3 being substantially equal to 1.2 mm, when a numerical aperture required for recording data to and/or reproducing data from the first optical disc is represented by NA1, a numerical aperture required for recording data to and/or reproducing data-from the second optical disc is represented by NA2, and a numerical aperture required for recording data to and/or reproducing data from the third optical disc is represented by NA3, a relationship $NA1 \geq NA2 > NA3$ being satisfied, when the first and second optical discs are used, substantially collimated light beams of the first and second light beams being incident on said objective lens, respectively, when the third optical disc is used, a diverging beam of the third light beam being incident on said objective lens, given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) being satisfied:

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3)$$

at least one of lens surfaces of said objective lens comprising a diffracting structure having a first region for converging the third light beam on a data recording layer of the third optical disc, the diffracting structure within the first region being configured such that a diffraction order at which diffraction efficiency of the first light beam is maximized is a sixth order, a diffraction order at which the diffraction efficiency of the second light beam is maximized is a fourth order, and a diffraction order at which the diffraction efficiency of the third light beam is maximized is a third order.

2. The objective lens according to claim 1,
wherein the diffracting structure within the first region includes a plurality of refractive surfaces having steps between adjacent refractive surfaces,
wherein the steps has a repetition of a first step giving an additional optical path length being substantially equal to $8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step.

3. The objective lens according to claim 1,
wherein the diffracting structure within the first region includes a plurality of refractive surfaces having steps between adjacent refractive surfaces,
wherein the steps has a repetition of a first step giving an additional optical path length being substantially equal to $-8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

4. The objective lens according to claim 1,
wherein the diffracting structure has a second region for converging the first and second light beams on data recording layers of the first and second optical discs, respectively, the diffracting structure within the second region not contributing to converging the third light beam,
wherein the diffracting structure within the second region being configured such that a diffraction order at which diffraction efficiency of the first light beam is maximized is a third order, and a diffraction order at which the diffraction efficiency of the second light beam is maximized is a second order.

5. The objective lens according to claim 4,
wherein a following condition (4) is satisfied:

$$f1 \times NA1 > f2 \times NA2 \quad (4),$$

wherein the diffracting structure has a third region which is located outside the second region and which converges only the first light beam,
wherein the third region is configured such that the diffraction order at which the diffraction efficiency of the first light beam is maximized in the third region is different from the diffraction order at which the diffraction efficiency of the first light beam is maximized in the second region.

6. The objective lens according to claim 4,
wherein a following condition (5) is satisfied:

$$f1 \times NA1 < f2 \times NA2 \quad (5),$$

wherein the diffracting structure has a third region which is located outside the second region and which converges only the second light beam,
wherein the third region is configured such that the diffraction order at which the diffraction efficiency of the second light beam is maximized in the third region is different from the diffraction order at which the diffraction efficiency of the second light beam is maximized in the second region.

7. The objective lens according to claim 1, wherein the first region is located to include an optical axis of said objective lens.

8. The objective lens according to claim 4,
wherein the first region is located to include an optical axis of said objective lens,
wherein the second region is located outside the first region.

9. An optical pick-up used for recording data to and/or reproducing data from at least three types of optical discs having at least two different thicknesses of cover layers, comprising:
light sources capable of emitting at least three light beams having different wavelengths respectively corresponding to the at least three types of optical discs, one of the at least three light beams being selectively emitted when one of the at least three types of optical discs is used; and
an objective lens,
when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm, and t3 being substantially equal to 1.2 mm,
when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied,
when the first and second optical discs are used, substantially collimated light beams of the first and second light beams being incident on said objective lens, respectively,
when the third optical disc is used, a diverging beam of the third light beam being incident on said objective lens,
given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) being satisfied:

$$-0.02 < f1 \times M1 < 0.02 \tag{1}$$

$$-0.02 < f2 \times M2 < 0.02 \tag{2}$$

$$-0.29 < f3 \times M3 < -0.19 \tag{3}$$

at least one of lens surfaces of said objective lens comprising a diffracting structure having a first region for converging the third light beam on a data recording layer of the third optical disc, the diffracting structure within the first region being configured such that a diffraction order at which diffraction efficiency of the first light beam is maximized is a sixth order, a diffraction order at which the diffraction efficiency of the second light beam is maximized is a fourth order, and a diffraction order at which the diffraction efficiency of the third light beam is maximized is a third order.

10. The optical pick-up according to claim 9,
wherein the diffracting structure within the first region includes a plurality of refractive surfaces having steps between adjacent refractive surfaces,
wherein the steps has a repetition of a first step giving an additional optical path length being substantially equal to $8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step.

11. The optical pick-up according to claim 9,
wherein the diffracting structure within the first region includes a plurality of refractive surfaces having steps between adjacent refractive surfaces,
wherein the steps has a repetition of a first step giving an additional optical path length being substantially equal to $-8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

12. The optical pick-up according to claim 9,
wherein the diffracting structure has a second region for converging the first and second light beams on data recording layers of the first and second optical discs, respectively, the diffracting structure within the second region not contributing to converging the third light beam,
wherein the diffracting structure within the second region being configured such that a diffraction order at which diffraction efficiency of the first light beam is maximized is a third order, and a diffraction order at which the diffraction efficiency of the second light beam is maximized is a second order.

13. The optical pick-up according to claim 12,
wherein a following condition (4) is satisfied:

$$f1 \times NA1 > f2 \times NA2 \tag{4},$$

wherein the diffracting structure has a third region which is located outside the second region and which converges only the first light beam,
wherein the third region is configured such that the diffraction order at which the diffraction efficiency of the first light beam is maximized in the third region is different from the diffraction order at which the diffraction efficiency of the first light beam is maximized in the second region.

14. The optical pick-up according to claim 12,
wherein a following condition (5) is satisfied:

$$f1 \times NA1 < f2 \times NA2 \tag{5},$$

wherein the diffracting structure has a third region which is located outside the second region and which converges only the second light beam,
wherein the third region is configured such that the diffraction order at which the diffraction efficiency of the second light beam is maximized in the third region is different from the diffraction order at which the diffraction efficiency of the second light beam is maximized in the second region.

15. The optical pick-up according to claim 9, wherein the first region is located to include an optical axis of said objective lens.

16. The optical pick-up according to claim 12,
wherein the first region is located to include an optical axis of said objective lens,
wherein the second region is located outside the first region.

17. The optical pick-up according to claim 9,
wherein when wavelengths of the first, second and third light beams are respectively represented by $\lambda_1$, $\lambda_2$ and $\lambda_3$, and refractive indexes of said objective lens for the first, second and third light beams are respectively represented by $n_1$, $n_2$ and $n_3$, following relationships are satisfied:

$$\lambda_1/(n_1-1):\lambda_3/(n_3-1) \cong 1:2 \tag{6}$$

$$\lambda_1/(n_1-1):\lambda_2/(n_2-1) \cong 3:5 \tag{7}.$$

18. An optical pick-up used for recording data to and/or reproducing data from at least three types of optical discs having at least two different thicknesses of cover layers, comprising:
light sources capable of emitting at least three light beams having different wavelengths respectively corresponding to the at least three types of optical discs, one of the at least three light beams being selectively emitted when one of the at least three types of optical discs is used;
a diffraction element through which each of the at least three light beams passes; and
an objective lens located between said diffraction element and one of the at least three types of optical discs being used,
at least one of surfaces of said diffraction element comprising a diffracting structure which includes a plurality of refractive surfaces having steps between adjacent refractive surfaces,
wherein the steps has a repetition of a first step giving an additional optical path length being substantially equal to $8\lambda_1$ ($\lambda_1$ is a wavelength of one of the at least three light beams having a shortest wavelength), which is added in an outer refractive surface outside of the first step with respect to an inner refractive surface inside of the first step, and a second step giving an additional optical path-length being substantially equal to $-2\lambda_1$, which is added in an outer refractive surface outside of the second step with respect to an inner refractive surface inside of the second step.

19. An optical pick-up used for recording data to and/or reproducing data from at least three types of optical discs having at least two different thicknesses of cover layers, comprising:

light sources capable of emitting at least three light beams having different wavelengths respectively corresponding to the at least three types of optical discs, one of the at least three light beams being selectively emitted when one of the at least three types of optical discs is used;

a diffraction element through which each of the at least three light beams passes; and an objective lens located between said diffraction element and one of the at least three types of optical discs being used, given that one of the at least three types of optical discs to be used for recording data and/or reproducing data using a first light beam of the at least three light beams having a wavelength shortest of all wavelengths of the at least three light beams is a first optical disc, one of the at least three types of optical discs to be used for recording data and/or reproducing data using a second light beam of the at least three light beams having a wavelength longer than that of the first light beam is a second optical disc, and one of the at least three types of optical discs to be used for recording data and/or reproducing data using a third light beam of the at least three light beams having a wavelength longest of all of the wavelengths of the at least three light beams is a third optical disc, following conditions, (1), (2) and (3) being satisfied:

$$-0.02 < f1 \times M1 < 0.02 \tag{1}$$

$$-0.02 < f2 \times M2 < 0.02 \tag{2}$$

$$-0.29 < f3 \times M3 < -0.19 \tag{3}$$

where f1, f2 and f3 represent focal lengths of said objective lens when the first, second and third optical discs are used, respectively, and M1, M2 and M3 represent magnification of said objective lens when the first, second and third optical discs are used, respectively, at least one of surfaces of said diffraction element comprising a diffracting structure which includes a plurality of refractive surfaces having steps between adjacent refractive surfaces, wherein the steps has a repetition of a first step giving an additional optical path length being substantially equal to $8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $-2\lambda_1$, which is added in an outer refractive surface outside of the second step with respect to an inner refractive surface inside of the second step, wherein when wavelengths of the second and third light beams are respectively represented by $\lambda_2$ and $\lambda_3$, and refractive indexes of said objective lens for the first, second and third light beams are respectively represented by $n_1$, $n_2$ and $n_3$, following relationships are satisfied:

$$\lambda_1/(n_1-1):\lambda_3/(n_3-1) \cong 1:2 \tag{6}$$

$$\lambda_1/(n_1-1):\lambda_2/(n_2-1) \cong 3:5 \tag{7}.$$

20. An optical pick-up used for recording data to and/or reproducing data from at least three types of optical discs having at least two different thicknesses of cover layers, comprising:

light sources capable of emitting at least three light beams having different wavelengths respectively corresponding to the at least three types of optical discs, one of the at least three light beams being selectively emitted when one of the at least three types of optical discs is used;

a diffraction element through which each of the at least three light beams passes; and an objective lens located between said diffraction element and one of the at least three types of optical discs being used, at least one of surfaces of said diffraction element comprising a diffracting structure which includes a plurality of refractive surfaces having steps between adjacent refractive surfaces, wherein the steps has a repetition of a first step giving an additional optical path length being substantially equal to $-8\lambda_1$ ($\lambda_1$ is a wavelength of one of the at least three light beams having a shortest wavelength), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step.

21. An optical pick-up used for recording data to and/or reproducing data from at least three types of optical discs having at least two different thicknesses of cover layers, comprising:

light sources capable of emitting at least three light beams having different wavelengths respectively corresponding to the at least three types of optical discs, one of the at least three light beams being selectively emitted when one of the at least three types of optical discs is used;

a diffraction element through which each of the at least three light beams passes; and an objective lens located between said diffraction element and one of the at least three types of optical discs being used, given that one of the at least three types of optical discs to be used for recording data and/or reproducing data using a first light beam of the at least three light beams having a wavelength shortest of all wavelengths of the at least three light beams is a first optical disc, one of the at least three types of optical discs to be used for recording data and/or reproducing data using a second light beam of the at least three light beams having a wavelength longer than that of the first light beam is a second optical disc, and one of the at least three types of optical discs to be used for recording data and/or reproducing data using a third light beam of the at least three light beams having a wavelength longest of all of the wavelengths of the at least three light beams is a third optical disc, following conditions (1), (2) and (3) being satisfied:

$$-0.02 < f1 \times M1 < 0.02 \tag{1}$$

$$-0.02 < f2 \times M2 < 0.02 \tag{2}$$

$$-0.29 < f3 \times M3 < -0.19 \tag{3}$$

where f1, f2 and f3 represent focal lengths of said objective lens when the first, second and third optical discs are used, respectively, and M1, M2 and M3 represent magnification of said objective lens when the first, second and third optical discs are used, respectively, at least one of surfaces of said diffraction element comprising a diffracting structure which includes a plurality of refractive surfaces having steps between adjacent refractive surfaces, wherein the steps has a repetition of a first step giving an additional optical path length being substantially equal to $-8\lambda_1$ ($\lambda_1$ is a wavelength of the first light beam), which is added in an outer refractive surface outside of the first step with respect to an inner refractive surface inside of the first step, and a second step giving an additional optical path length being substantially equal to $2\lambda_1$, which is added in an outer refractive surface outside of the second step with respect to an inner refractive surface inside of the second step, wherein when wavelengths of the second and third light beams are respectively represented by $\lambda_2$ and $\lambda_3$, and refractive indexes of said objective lens for the first, second and third light beams are respectively represented by $n_1$, $n_2$ and $n_3$, following relationships are satisfied:

$$\lambda_1/(n_1-1):\lambda_3/(n_3-1) \cong 1:2 \qquad (6)$$

$$\lambda_2/(n_1-1):\lambda_2/(n_2-1) \cong 3:5 \qquad (7).$$

* * * * *